(12) United States Patent
Ratner

(10) Patent No.: US 12,202,450 B2
(45) Date of Patent: Jan. 21, 2025

(54) METHODS AND APPARATUS FOR RAPIDLY DECELERATING A VEHICLE

(71) Applicant: Nuro, Inc., Mountain View, CA (US)

(72) Inventor: Daniel Jason Ratner, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 365 days.

(21) Appl. No.: 17/570,831

(22) Filed: Jan. 7, 2022

(65) Prior Publication Data

US 2022/0227335 A1 Jul. 21, 2022

Related U.S. Application Data

(60) Provisional application No. 63/138,034, filed on Jan. 15, 2021.

(51) Int. Cl.
*B60T 1/14* (2006.01)

(52) U.S. Cl.
CPC ........................................ *B60T 1/14* (2013.01)

(58) Field of Classification Search
CPC .............................................. B60T 1/14
USPC ........................................................ 188/6, 7
See application file for complete search history.

(56) References Cited

U.S. PATENT DOCUMENTS

| | | | |
|---|---|---|---|
| 1,753,588 A * | 4/1930 | Baillie | B60T 1/14 188/5 |
| 2,049,357 A * | 7/1936 | Daignault | B60T 1/14 188/5 |
| 2,103,231 A * | 12/1937 | Blake | F25D 23/00 188/6 |
| 2,695,682 A * | 11/1954 | Ehlinger | B60T 1/14 188/5 |
| 3,042,150 A * | 7/1962 | Lukawsky | B60T 1/14 188/4 R |
| 3,292,738 A * | 12/1966 | Bernert | B60T 1/14 188/6 |
| 4,066,151 A | 1/1978 | Liebscher et al. | |
| 4,265,338 A | 5/1981 | Shea et al. | |
| 4,317,507 A | 3/1982 | McMillan | |
| 4,613,015 A * | 9/1986 | Skrzypek | B60T 1/14 188/6 |
| 5,435,418 A * | 7/1995 | Warren | B60T 1/14 188/106 R |
| 5,439,076 A | 8/1995 | Percy, Jr. | |
| 5,444,949 A | 8/1995 | Ciaccio | |

(Continued)

FOREIGN PATENT DOCUMENTS

| | | | | |
|---|---|---|---|---|
| CN | 106274853 A | * | 1/2017 | ............... B60T 1/14 |
| CN | 107054317 A | * | 8/2017 | ............... B60T 1/14 |

(Continued)

*Primary Examiner* — Thomas J Williams
(74) *Attorney, Agent, or Firm* — Edell, Shapiro & Finnan, LLC

(57) ABSTRACT

A rapid deceleration mechanism for a vehicle is provided herein. The rapid deceleration mechanism decelerates a body of the vehicle traveling on a road surface. The rapid deceleration mechanism includes at least one bollard attached to the body and at least one energetics arrangement. The at least one energetics arrangement propels the at least one bollard from the body toward the road surface to decelerate the body such that at least one of a portion of the body or the at least one bollard is deformed.

22 Claims, 17 Drawing Sheets

(56) References Cited

U.S. PATENT DOCUMENTS

| | | | |
|---|---|---|---|
| 5,638,923 A * | 6/1997 | Liu | B60T 1/14 |
| | | | 188/6 |
| 9,487,190 B1 | 11/2016 | Alvarado | |
| 10,369,976 B1 | 8/2019 | Ratner | |
| 2008/0136133 A1 | 6/2008 | Takahashi | |
| 2010/0084426 A1 | 4/2010 | Devers et al. | |
| 2011/0017538 A1 | 1/2011 | Baumann et al. | |
| 2011/0155496 A1 | 6/2011 | Baumann et al. | |
| 2011/0198161 A1 | 8/2011 | Lomazzo | |
| 2013/0037355 A1 | 2/2013 | Baker et al. | |
| 2014/0081445 A1 | 3/2014 | Villamar | |
| 2014/0191078 A1 | 7/2014 | Boren et al. | |
| 2015/0006005 A1 | 1/2015 | Yu et al. | |
| 2017/0101095 A1 | 4/2017 | Nilsson et al. | |
| 2017/0174343 A1 | 6/2017 | Erickson et al. | |
| 2019/0210595 A1 * | 7/2019 | Cheaz | B60W 40/06 |
| 2019/0263365 A1 | 8/2019 | Krasnhoff | |
| 2021/0129806 A1 * | 5/2021 | Vidano | F16D 63/008 |
| 2022/0227335 A1 * | 7/2022 | Ratner | F16D 63/008 |

FOREIGN PATENT DOCUMENTS

| | | | | |
|---|---|---|---|---|
| CN | 107199996 A | * | 9/2017 | ............ B60T 1/14 |
| CN | 108528413 A | * | 9/2018 | |
| DE | 3437402 A1 | | 4/1986 | |
| DE | 102005009949 A1 | | 9/2006 | |
| DE | 102012021019 A1 | * | 4/2014 | ............ B60T 1/14 |
| DE | 102014017515 B4 | * | 6/2019 | ............ B60T 1/14 |
| DE | 102018207474 A1 | * | 11/2019 | ............ B60T 1/14 |
| DE | 102018207477 A1 | * | 11/2019 | ............ B60T 1/14 |
| DE | 102018209966 A1 | * | 12/2019 | ............ B60T 1/02 |
| DE | 102018210172 A1 | * | 12/2019 | ............ B60T 1/14 |
| FR | 2926517 A1 | * | 7/2009 | ............ B60T 1/14 |
| KR | 20130005045 A | * | 1/2013 | ............ B60T 1/14 |
| WO | WO-03020560 A1 | * | 3/2003 | ............ B60T 1/14 |
| WO | 2017/117303 A1 | | 7/2017 | |

* cited by examiner

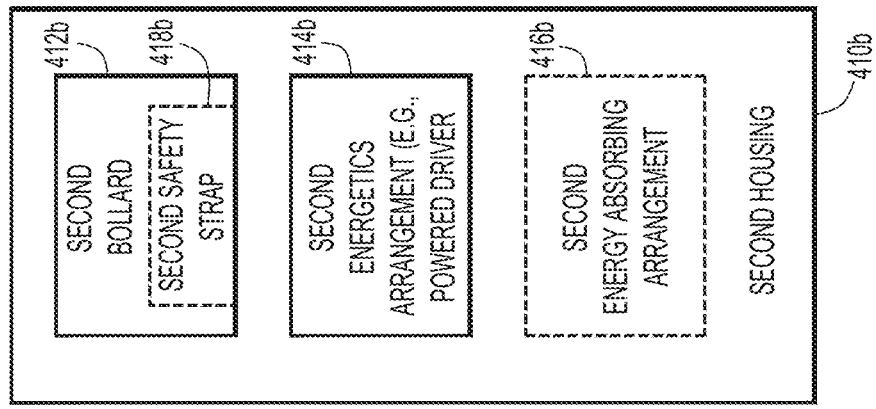
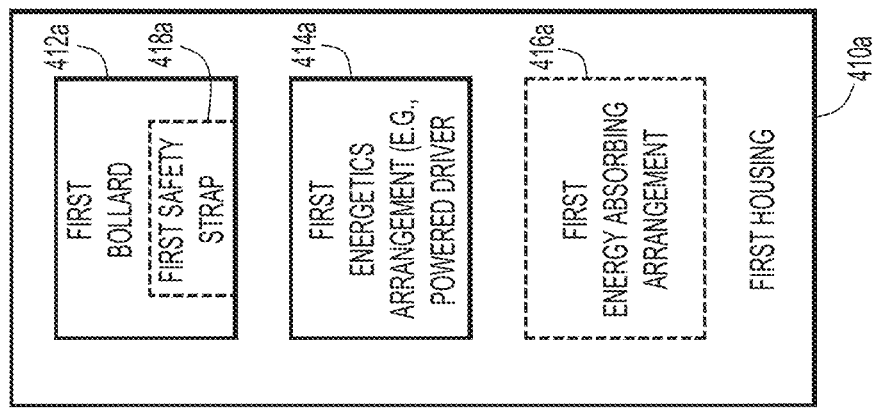
FIG. 4

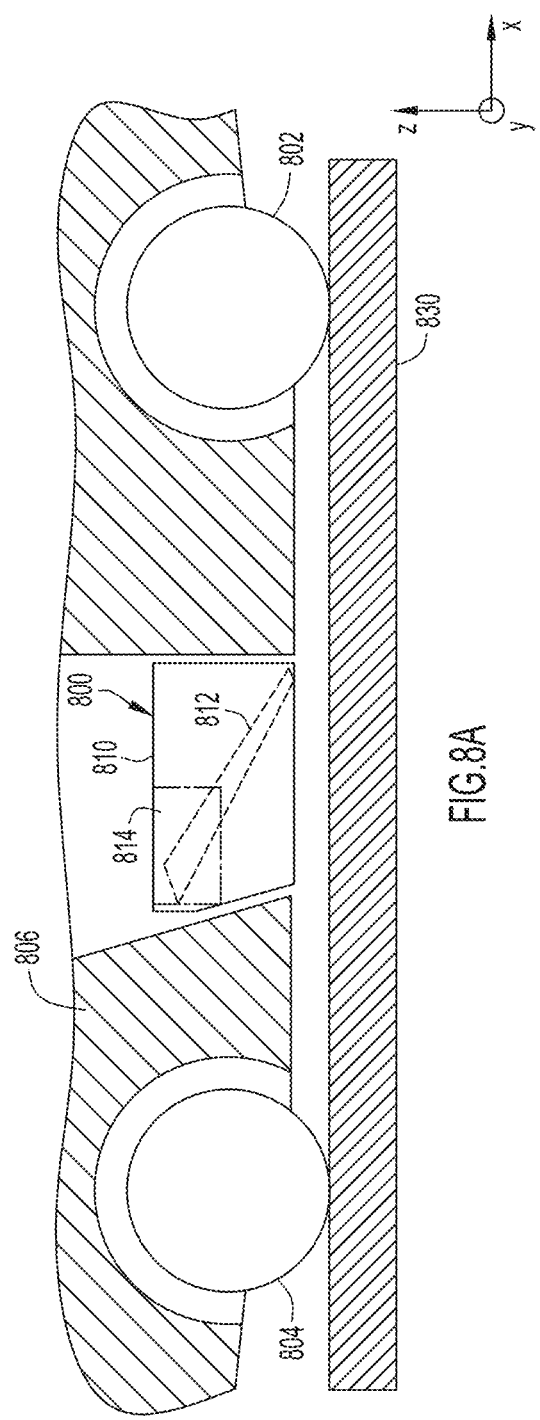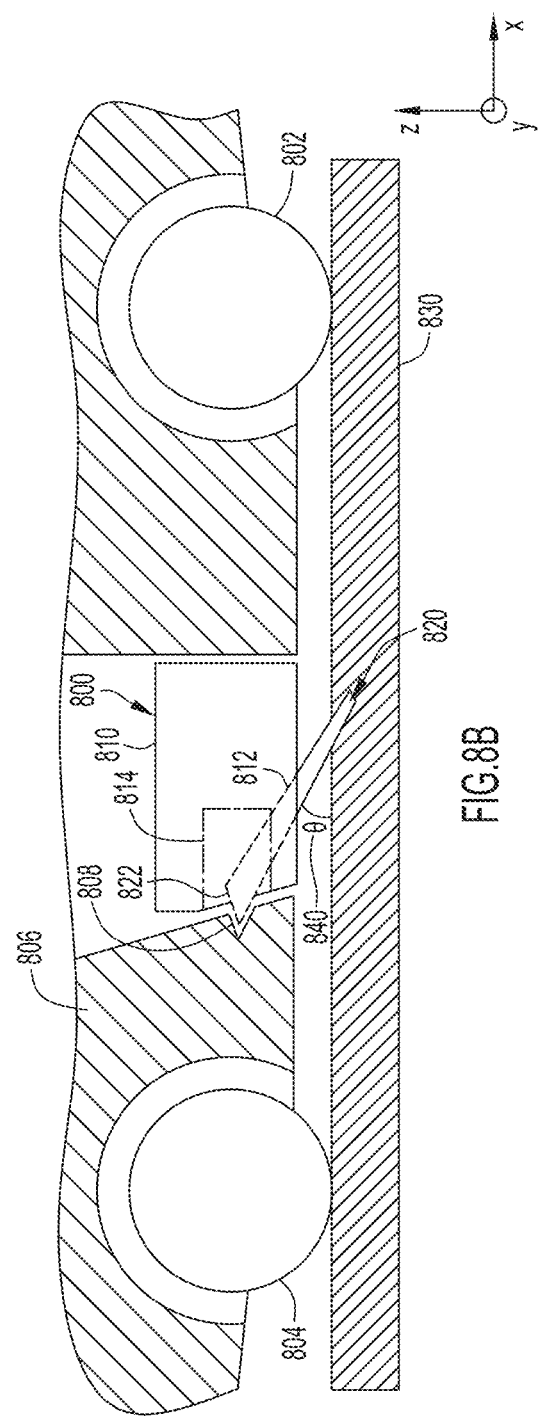

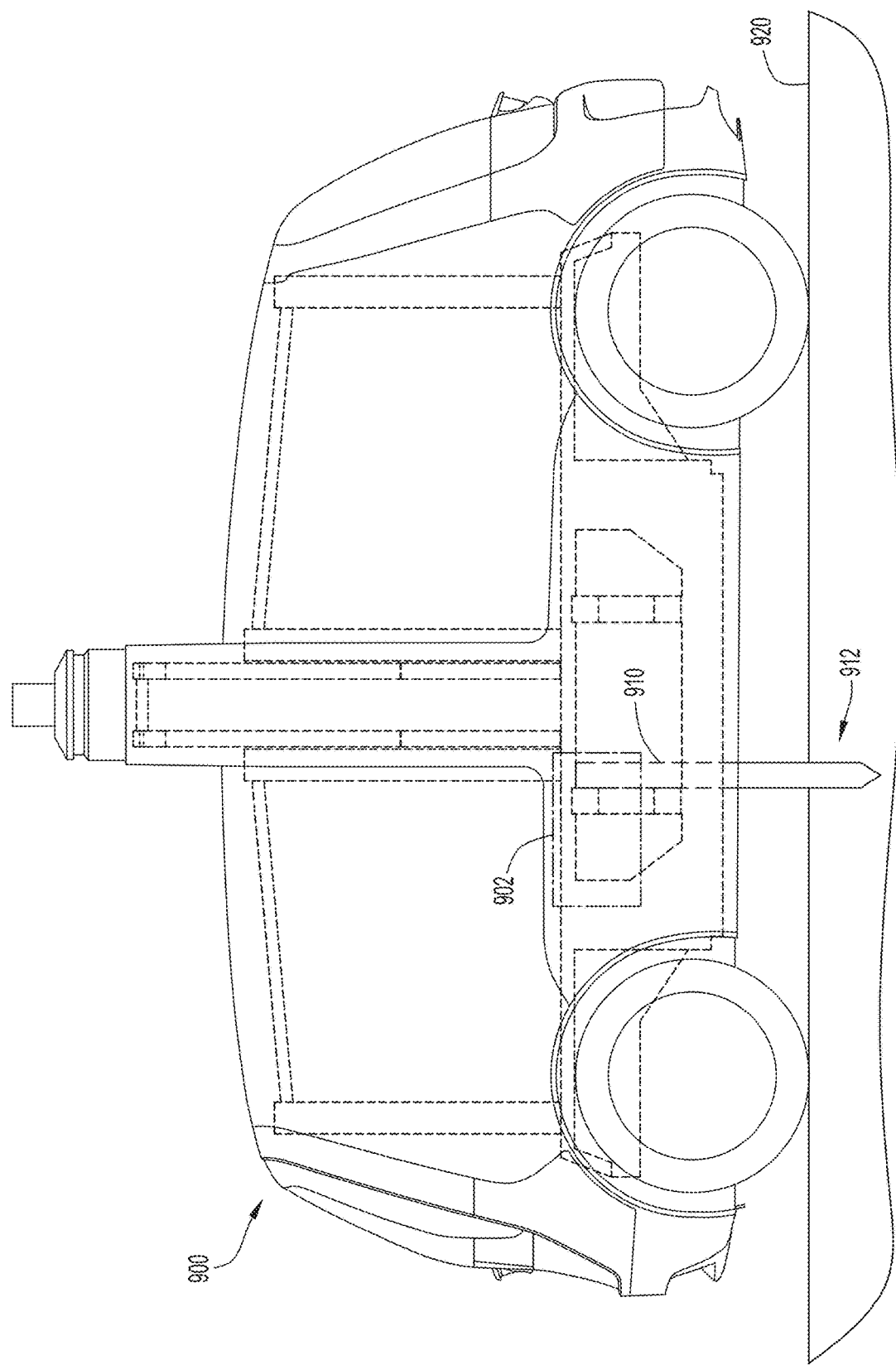

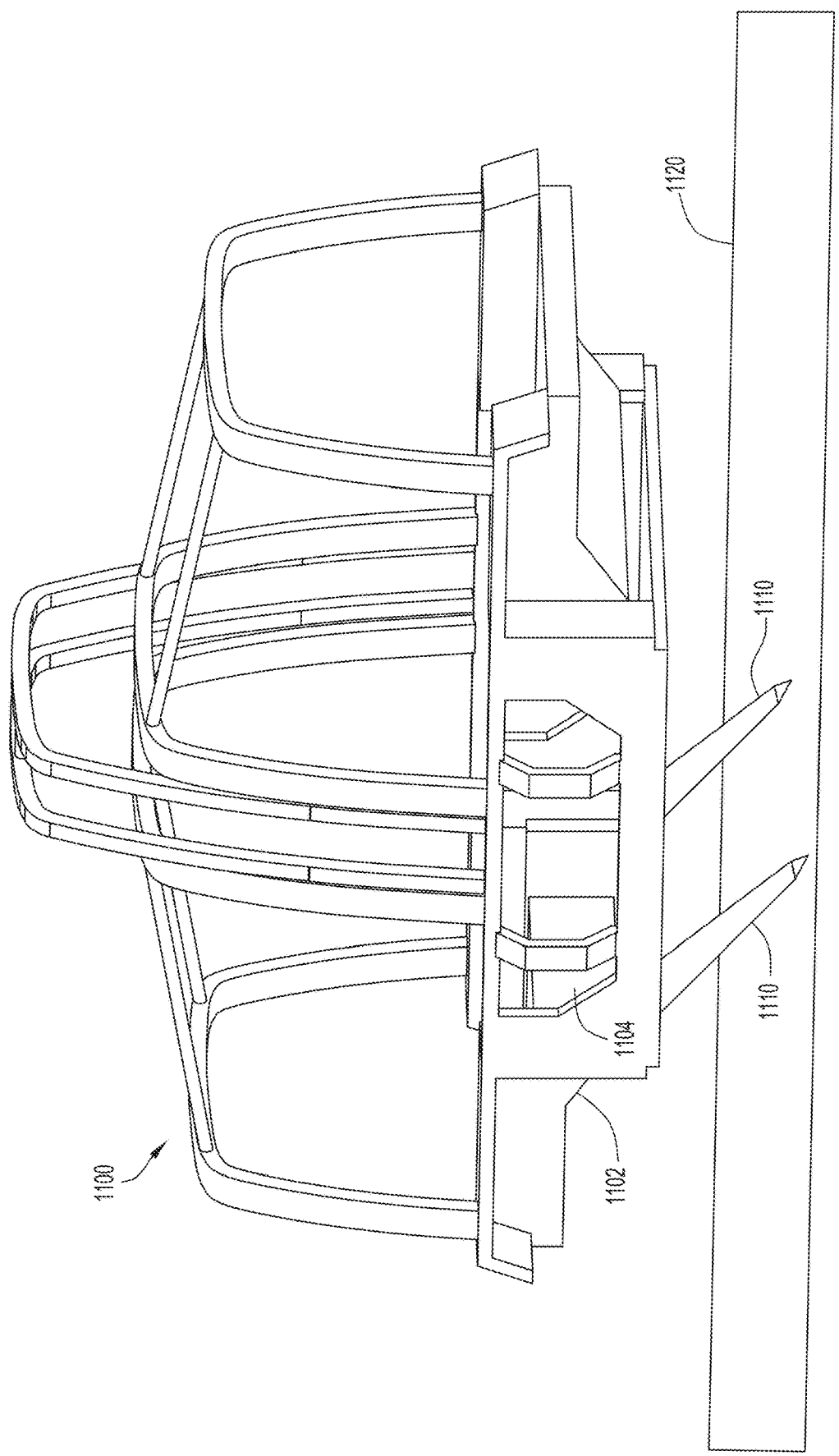

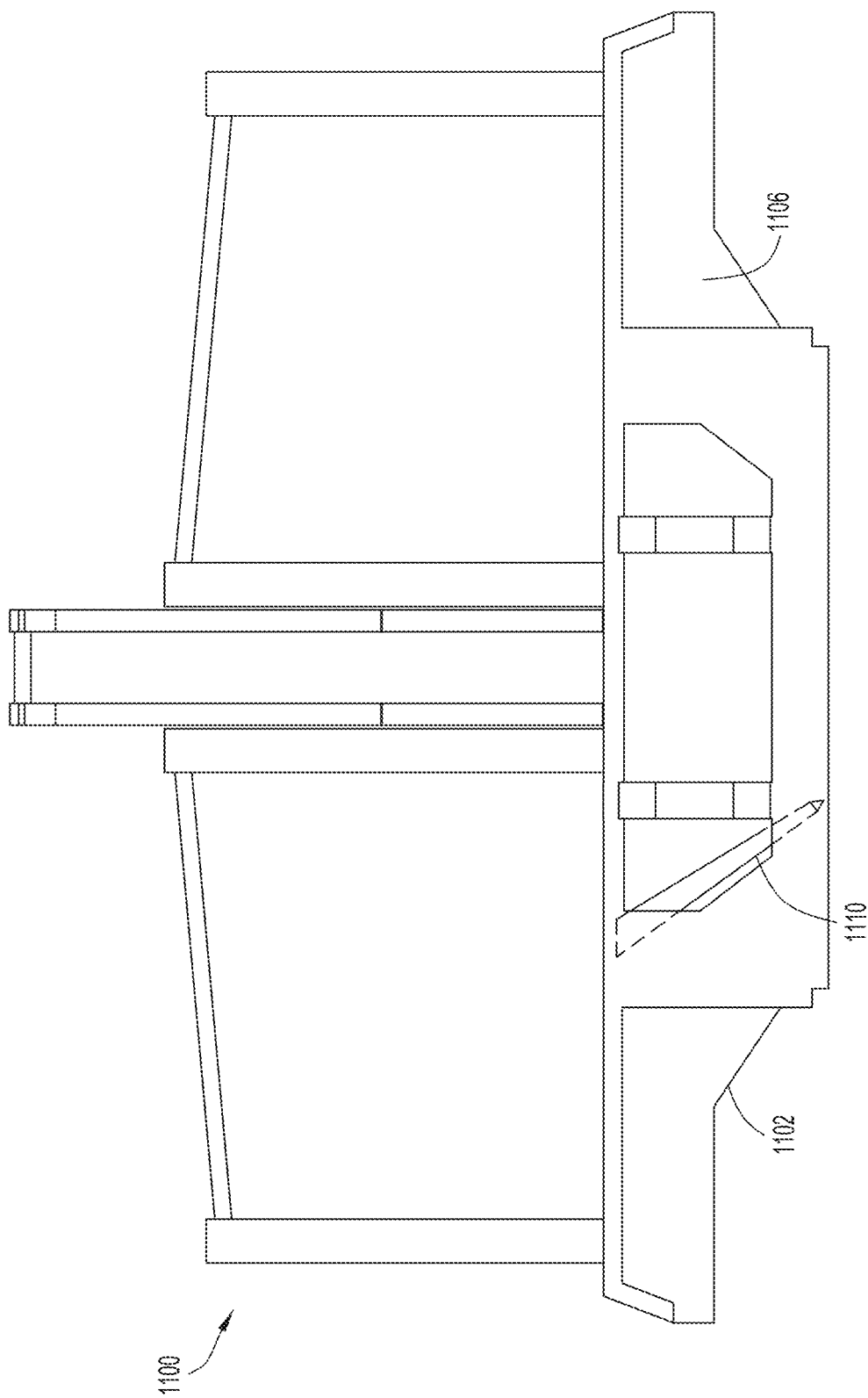

METHODS AND APPARATUS FOR RAPIDLY DECELERATING A VEHICLE

CROSS-REFERENCE TO RELATED APPLICATION

This application claims priority under 35 U.S.C. § 119(e) to U.S. Provisional Patent Application No. 63/138,034, entitled "Methods and Apparatus for Rapidly Decelerating a Vehicle," filed Jan. 15, 2021, which is hereby incorporated by reference in its entirety.

TECHNICAL FIELD

The disclosure relates to autonomous vehicles, and more particularly, to rapidly decelerating a vehicle.

BACKGROUND

As the use of autonomous vehicles becomes more prevalent, the ability for the autonomous vehicles to operate safely and reliably is ever increasing. When vehicles drive, autonomously or under the control of an operator or driver, there are many instances in which vehicles in motion need to stop as quickly as possible. For example, when a pedestrian crosses a roadway directly in a path of a vehicle, the vehicle generally must either take evasive measures or come to a fast stop to avoid striking the pedestrian. In many instances, it may not be possible for a vehicle to swerve or to stop fast enough to avoid a collision. The ability to come to a fast stop, or to decelerate rapidly, is crucial to allow vehicles to avoid collisions. Known solutions which decelerate a vehicle include Torricelli brakes, air brakes, hydraulic brakes, and pneumatic brakes. These brakes, while generally allowing vehicles to brake, are sometimes inadequate to provide rapid deceleration in part because of significant frictional forces that arise when the brakes are engaged.

BRIEF DESCRIPTION OF THE DRAWINGS

FIG. 4 is a block diagram of a rapid deceleration system, according to an example embodiment.

FIGS. 8A and 8B are diagrams illustrating a rapid deceleration system in an undeployed and deployed state, respectively, according to an example embodiment.

FIGS. 9A-9C are diagrams illustrating a vehicle with a rapid deceleration system in a traveling state, deceleration state, and rapidly stopped state, respectively, according to an example embodiment.

FIG. 11A-11C are diagrams illustrating a frame of a vehicle with bollards of a rapid deceleration system in various states, according to an example embodiment.

DESCRIPTION OF EXAMPLE EMBODIMENTS

Overview

Figure 1:
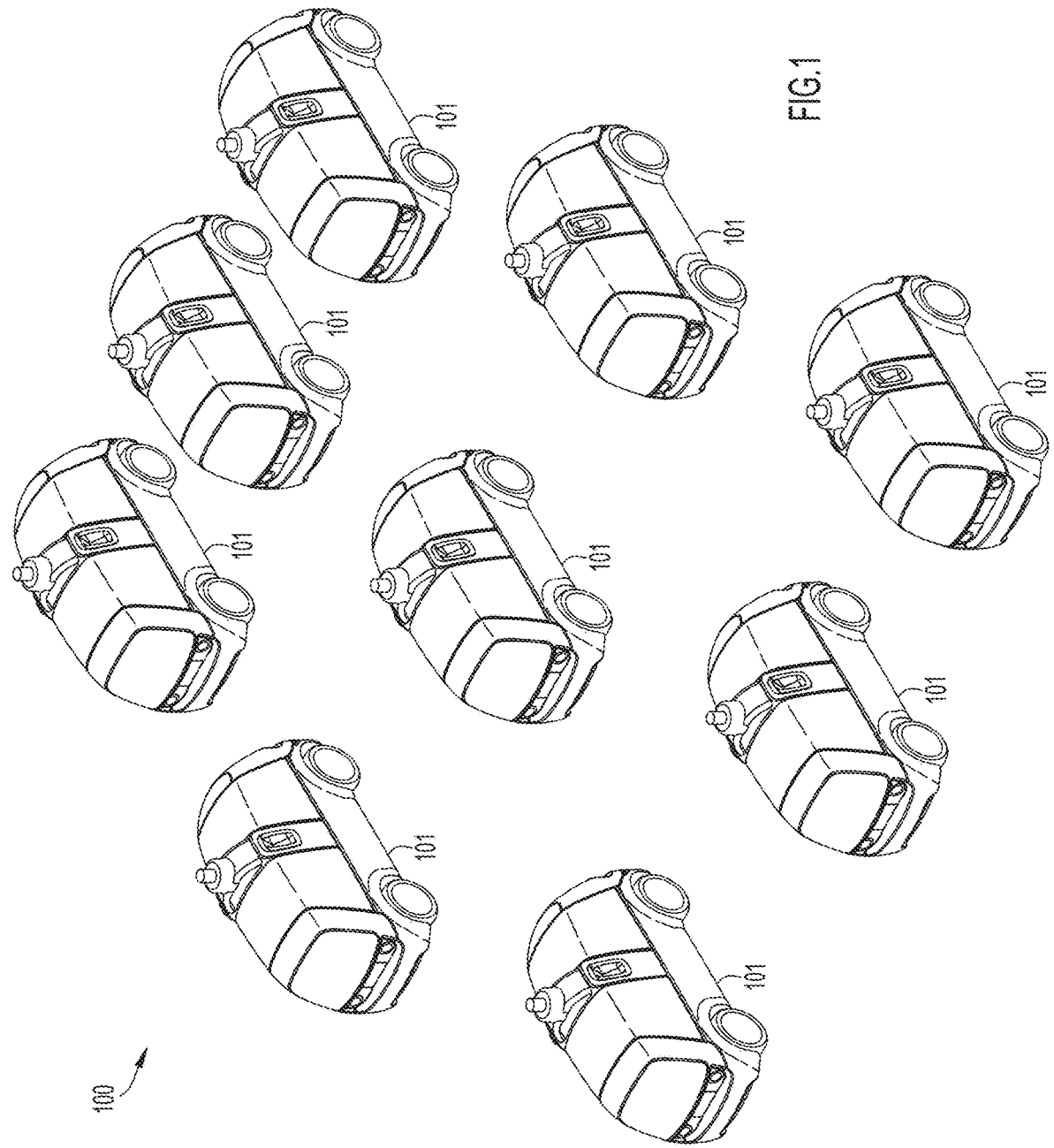
FIG. 1 is a diagram of an autonomous vehicle fleet in which an autonomous vehicle includes a rapid deceleration system, according to an example embodiment.

Apparatuses, methods, and systems are provided to rapidly decelerate a vehicle. In one embodiment, a vehicle includes a body and a rapid deceleration mechanism configured to decelerate the body traveling on a road surface. The rapid deceleration mechanism includes at least one bollard attached to the body and at least one energetics arrangement configured to propel the at least one bollard from the body toward the road surface to decelerate the body such that at least one of a portion of the body or the at least one bollard is deformed.

In another embodiment, a method is performed in which at least one bollard, which is attached to a body of a vehicle, is propelled from the vehicle, via at least one energetics arrangement, toward a road surface on which the vehicle is traveling. The method further involves decelerating the vehicle by deforming at least one of the body of the vehicle or the at least one bollard.

In yet another embodiment, a rapid deceleration system includes at least one bollard attached to a body of a vehicle and at least one energetics arrangement. The at least one energetics arrangement is configured to propel the at least one bollard from the vehicle toward a road surface on which the vehicle is traveling to decelerate the vehicle such that at least one of a portion of the body or the at least one bollard is deformed.

Example Embodiments

While braking systems on a vehicle, such as an autonomous vehicle, may serve to provide adequate deceleration and braking in most situations, some situations may arise in which rapid deceleration that may not be accomplished using braking systems may be needed. For example, if a vehicle is travelling or driving and an obstacle such as a pedestrian suddenly appears directly in front of the vehicle, the use of braking systems may not be adequate to prevent the vehicle from colliding; with the obstacle.

Providing a rapid deceleration system or mechanism for use when a braking system on a vehicle is expected to be inadequate may prevent a vehicle from a collision or at least increase the chances of averting a collision. A rapid deceleration system may be deployed as a "last chance" braking system that may be activated to cause the vehicle to come to a stop when conditions indicate that a primary braking system may be insufficient. These conditions may include, but are not limited to including, a speed at which the vehicle is travelling, a current distance between the vehicle and an anticipated location of a collision with an obstacle, and/or a speed at which an obstacle is travelling. Unlike humanoperated vehicles, autonomous or unmanned vehicles can be rapidly stop without care for the well-being of the vehicle.

According to one example embodiment, if a collision is considered to be imminent and it is determined that the collision may not be avoided using a primary braking system of an autonomous vehicle alone to decelerate the autonomous vehicle, then a rapid deceleration system may be activated or engaged. The rapid deceleration system may, when activated, effectively anchor a vehicle to a surface on which the vehicle is travelling. The rapid deceleration system may be arranged to alter, e.g., damage, a surface on which the vehicle is travelling in order to substantially ensure that a collision is avoided.

A system for rapidly decelerating a vehicle may include at least one powered driver and at least one bollard supported by the powered driver. The powered driver may be arranged to be to be movably coupled to a frame or a chassis of the vehicle. The powered driver may also be configured to propel the at least one bollard from the powered driver into a road surface to both secure the vehicle to the road surface and to absorb energy through substantially deforming the bollard and/or the vehicle chassis or frame (body of the vehicle). The use of a powered driver to effectively drive or force a bollard into a surface such as a road surface allows a vehicle to decelerate.

In one example embodiment, a rapid deceleration mechanism may include two modules positioned near rear tires of a vehicle and coupled to a vehicle frame. Each module may include a respective powered driver and a respective bollard. For example, the mechanism may include a pair of powered drivers and a pair of bollards, each supported by a respective powered driver. The powered drivers are configured to propel the bollards from the powered driver into a road surface when a rapid deceleration of the vehicle may not be safely accomplished using standard braking methods. The use of the powered drivers and the bollards serves to secure the vehicle to a road surface, while allowing deployment energy to be absorbed via deforming a portion of the vehicle's body such as a vehicle frame and/or by deforming the pair of bollards.

Example embodiments that may be used to implement the features and functionality of this disclosure will now be described with more particular reference to the accompanying figures. While like reference numerals represent like elements throughout the several figures for purposes of simplicity and clarity, repetition of reference numerals does not itself dictate a relationship between the various embodiments and/or configurations discussed. In addition, while reference may be made to the spatial relationships between various components and to the spatial orientation of various aspects of components as depicted in the attached drawings, as will be recognized by those skilled in the art after a complete reading of the present disclosure, the devices, components, members, apparatuses, etc. described herein may be positioned in any desired orientation. Thus, the use of terms such as "top," "bottom," "front," "back," "left," "right," "above," "under," "over," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

When used to describe a range of dimensions and/or other characteristics (e.g., time, distance, length, etc.) of an element, operations, conditions, etc. the phrase "between X and Y" represents a range that includes X and Y. Similarly, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". Similarly, when used herein, the term "comprises" and its derivations (such as "comprising", etc.) should not be understood in an excluding sense, that is, these terms should not be interpreted as excluding the possibility that what is described and defined may include further elements, steps, etc. Further, each example embodiment described herein as illustrative and is not to be construed as a preferred or advantageous embodiment, but rather as one example or illustration of a possible embodiment.

Many autonomous vehicles operate as part of a fleet of autonomous vehicles. Referring initially to FIG. 1, an autonomous vehicle fleet 100 will be described in accordance with an example embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
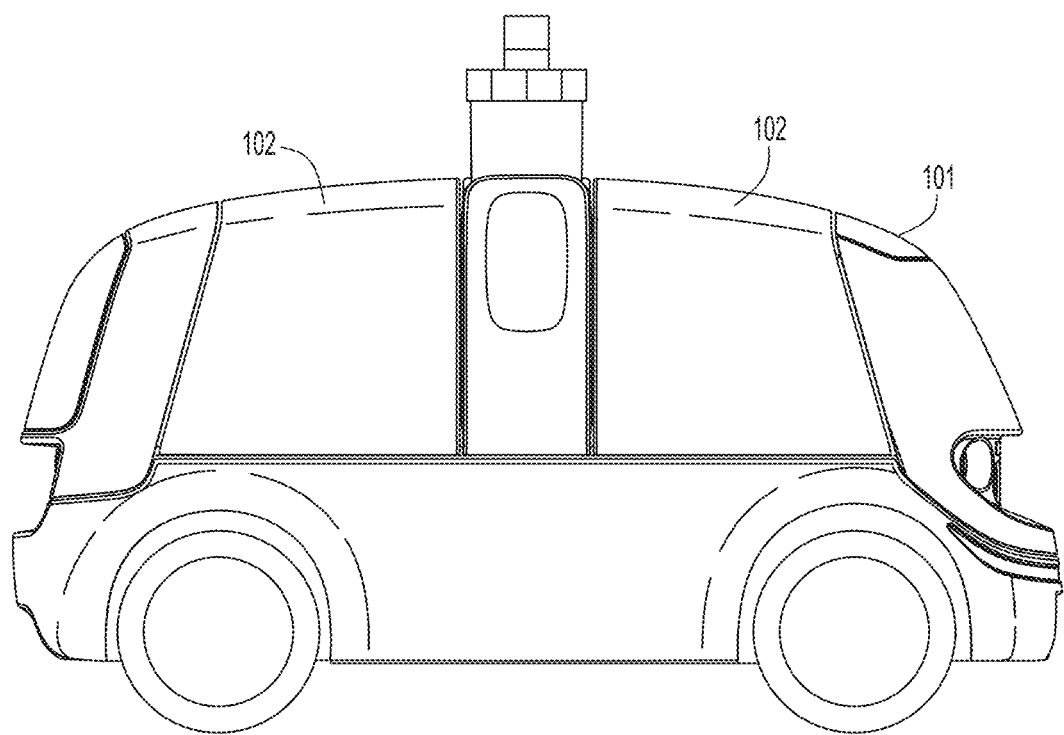
FIG. 2 is a diagram of an autonomous vehicle having a rapid deceleration system, according to an example embodiment.

FIG. 2 is a diagram of an autonomous vehicle, e.g., one of autonomous vehicles 101 of FIG. 1, according to an example embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one example embodiment, the autonomous vehicle 101 may be relatively narrow, e.g., approximately two to approximately five feet wide, and may have a relatively low mass and relatively low center of gravity for stability. The autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
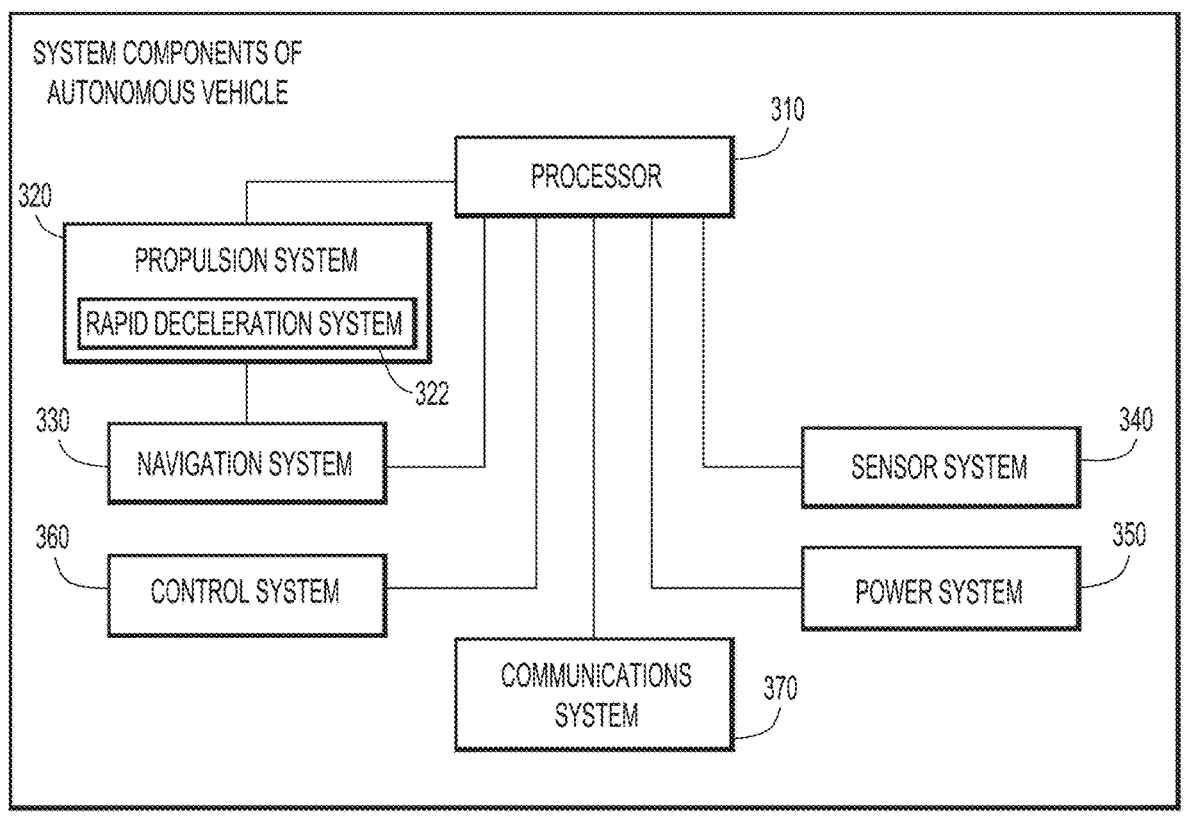
FIG. 3 is a block diagram of components of an autonomous vehicle configured with the rapid deceleration system, according to an example embodiment.

FIG. 3 is a block diagram of system components 300 of an autonomous vehicle, e.g., autonomous vehicle 101 of FIG. 1, according to an example embodiment. The system components 300 include a processor 310, a propulsion system 320, a navigation system 330, a sensor system 340, a power system 350, a control system 360, and a communications system 370. It should be appreciated that processor 310, propulsion system 320, navigation system 330, sensor system 340, power system 350, and communications system 370 are all coupled to a chassis or body of autonomous vehicle 101.

Processor 310 is arranged to send instructions to and to receive instructions from or for various components such as propulsion system 320, navigation system 330, sensor system 340, power system 350, and control system 360. Propulsion system 320, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 320 may be arranged to cause the engine, wheels, steering, and braking systems to cooperate to drive. In general, propulsion system 320 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Propulsion system 320 includes a rapid deceleration system 322 that may be configured to facilitate the rapid deceleration of vehicle 101, e.g., when braking systems are not sufficient to cause vehicle 101 to rapidly decelerate. In one example embodiment, rapid deceleration system 322 includes at least one bollard, each powered by energetics arrangement (a powered driver) that propels the bollard from the powered driver into a road surface. Rapid deceleration system 322 or mechanism will be discussed below in further detail with respect to FIG. 4.

Navigation system 330 may control propulsion system 320 to navigate autonomous vehicle 101 through paths and/or within unstructured open or closed environments. Navigation system 330 may include at least one of digital maps, street view photographs, and a global positioning system (GPS) point. Maps, for example, may be utilized in cooperation with sensors included in sensor system 340 to allow navigation system 330 to cause autonomous vehicle 101 to navigate through an environment.

Sensor system 340 includes any sensors, as for example LiDAR, radar, ultrasonic sensors, microphones, altimeters, and/or cameras. Sensor system 340 generally includes onboard sensors which allow autonomous vehicle 101 to safely navigate, and to ascertain when there are objects near autonomous vehicle 101. In one embodiment, sensor system 340 may include propulsion systems sensors that monitor drive mechanism performance, drive train performance, and/or power system levels. The sensor system 340 senses the environment surrounding the autonomous vehicle 101 and may detect an obstacle such as a pedestrian in the environment. The sensor system 340 communicates the detected environment to the processor 310.

Power system 350 is arranged to provide power to autonomous vehicle 101. Power may be provided as electrical power, gas power, or any other suitable power, e.g., solar power or battery power. In one embodiment, power system 350 may include a main power source, and an auxiliary power source that may serve to power various components of autonomous vehicle 101 and/or to generally provide power to autonomous vehicle 101 when the main power source does not does not have the capacity to provide sufficient power.

Communications system 370 allows autonomous vehicle 101 to communicate, as for example, wirelessly, with a fleet management system (not shown) that allows autonomous vehicle 101 to be controlled remotely. Communications system 370 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 360 may cooperate with processor 310 to determine where autonomous vehicle 101 may safely travel, and to determine the presence of objects in a vicinity around autonomous vehicle 101 based on data, e.g., results, from sensor system 340. In other words, control system 360 may cooperate with processor 310 to effectively determine what autonomous vehicle 101 may do within its immediate surroundings. Control system 360 in cooperation with processor 310 may essentially control power system 350 and navigation system 330 as part of driving or conveying autonomous vehicle 101. Additionally, control system 360 may cooperate with processor 310 and communications system 370 to provide data to or obtain data from other autonomous vehicles 101, a management server, a global positioning server (GPS), a personal computer, a teleoperations system, a smartphone, or any computing device via the communications system 370. In general, control system 360 may cooperate at least with processor 310, propulsion system 320, navigation system 330, sensor system 340, and power system 350 to allow vehicle 101 to operate autonomously. That is, autonomous vehicle 101 is able to operate autonomously through the use of an autonomy system that effectively includes, at least in part, functionality provided by propulsion system 320, navigation system 330, sensor system 340, power system 350, and control system 360. Components of propulsion system 320, navigation system 330, sensor system 340, power system 350, and control system 360 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 340 may be processed such that the environment around autonomous vehicle 101 may effectively be perceived.

The ability to rapidly decelerate a vehicle such as autonomous vehicle 101 enhances the ability of the vehicle to operate safely by increasing the likelihood that the vehicle may avoid collisions, e.g., by rapidly slowing to a stop in a relatively fast manner. When it is determined that a primary or "normal" braking system is unlikely to be sufficient to avoid an obstacle located along an immediate path a vehicle, a secondary or "emergency" deceleration system may be activated such as the rapid deceleration system 322. Rapid deceleration system 322 is arranged to rapidly decelerate by deploying a mechanism that cuts into a surface, e.g., a pavement or a surface of a roadway, to effectively anchor the vehicle to the surface i.e., to bring the vehicle to an immediate stop.

In one example embodiment, two bollards may be positioned and fired from a location on a vehicle that is substantially in front of a portion of a vehicle frame that is just in front of back wheels or back wheel wells. The rapid deceleration system 322 includes the bollards that may be arranged at least partially inside a vehicle and are to be deployed to substantially outside of the vehicle, e.g., underneath the vehicle. Each back wheel or back wheel well may be associated with a bollard, or otherwise have a bollard positioned nearby. The bollards may be deployed, e.g., fired, into a surface such as a road surface at an angle that is between approximately zero degrees and approximately ninety degrees. When the bollards are embedded into the road at this angle, the bollards may essentially contact the vehicle frame in front of the back wheel wells such that deployment energy may be at least partially absorbed by the vehicle frame. Further, because the bollards are deployed at an angle, as for example an angle of approximately forty-five degrees, upon bollards coming into contact with the vehicle frame, the vehicle may be deflected in a downwards direction towards the road surface.

FIG. 4 is a block diagram illustrating a rapid deceleration system 400 or mechanism e.g., rapid deceleration system 322 of FIG. 3, according to an example embodiment. Rapid deceleration system 400 includes a first housing 410a and a second housing 410b. Each housing is arranged to be positioned on a vehicle, such as vehicle 101 of FIGS. 1-3, in front of a rear wheel or rear wheel well, for example. First housing 410a includes a first bollard 412a, a first energetics arrangement 414a such as a powered driver, and an optional first energy absorbing arrangement 416a. Similarly, second housing 410b includes a second bollard 412b, a second energetics arrangement 414b such as a powered driver, and an optional second energy absorbing arrangement 416b. The number of housings is not limited to two and the rapid deceleration system 400 may include more or less housings to hold a respective rapid deceleration component. For example, rapid deceleration system 400 may include four housings, one next to each wheel or one housing in a middle of a vehicle, etc. In one example, the two housings are positioned substantially inside a body of the vehicle at a bottom portion thereof and are formed separately from one another.

First bollard 412a and second bollard 412b are configured to be deployed by first energetics arrangement 414a and second energetics arrangement 414b, respectively. First bollard 412a and second bollard 412b, when deployed, effectively cut into a surface on which a vehicle such as vehicle 101 of FIGS. 1-3 is travelling or driving. The configuration of first bollard 412a and second bollard 412b may vary widely. First bollard 412a and second bollard 412b may have various shapes and sizes, and may be formed from any suitable material, such as forged steel. For example, as will be discussed below with respect to FIGS. 10A and 10B, one suitable shape for first bollard 412a and second bollard 412b is a conical, tapered shape, e.g., a shape similar to half of a hollow cone.

First bollard 412a and second bollard 412b may include optional first safety strap 418a and second safety strap 418b, respectively. Optional first safety strap 418a and second safety strap 418b may be lanyards. First safety strap 418a and second safety strap 418b may be a sturdy belt or rope like material. First safety strap 418a and second safety strap 418b hold the respective bollards in place when the bollards are deformed.

Specifically, first safety strap 418a and second safety strap 418b may provide a safety mechanism between first bollard 412a and second bollard 412b, respectively, that are deployed into a road surface, and a vehicle such as vehicle 101 of FIGS. 1-3. In one example embodiment, first safety strap 418a and second safety strap 418b may be coupled to, e.g., substantially wrapped around, portions of a vehicle frame that are arranged to deform during a rapid deceleration. First safety strap 418a and second safety strap 418b may be attached to first bollard 412a and second bollard 412b, respectively, using a mechanism such as a D-ring. First safety strap 418a and second safety strap 418b ensures that first bollard 412a and second bollard 412b, respectively, do not detach from the vehicle body and/or frame of the vehicle. For example, first safety strap 418a and second safety strap 418b may be wrapped around first bollard 412a and second bollard 412b, respectfully to cause first bollard 412a and second bollard 412b not to propel beyond a preset amount, serving as a safety belt.

First energetics arrangement 414a and second energetics arrangement 414b are configured to propel first bollard 412a and second bollard 412b, respectively, from the body of the vehicle 101 toward the road surface. That is, first energetics arrangement 414a and second energetics arrangement 414b may be actuating mechanisms or powered drivers that deploy the first bollard 412a and second bollard 412b, respectively. Such deployment may include using first energetics arrangement 414a and second energetics arrangement 414b to effectively propel first bollard 412a and second bollard 412b, respectively, towards a road surface to cut into the road surface. First energetics arrangement 414a and second energetics arrangement 414b may include, but are not limited to including, pyrotechnic telescoping devices or other mechanisms which may be selectively activated to cause first bollard 412a and second bollard 412b to be deployed i.e., fired into the surface at various angles. The first energetics arrangement 414a and the second energetics arrangement 414b are movably attached to a vehicle frame or chassis.

Optionally, first energy absorbing arrangement 416a and second energy absorbing arrangement 416b are arranged to dissipate energy e.g., kinetic energy that is generated when first bollard 412a and second bollard 412b, respectively, are deployed to stop a vehicle, such as vehicle 101 of FIGS. 1-3. First energy absorbing arrangement 416a and second energy absorbing arrangement 416b may be any suitable devices. Suitable devices include, but are not limited to including, hydraulic shocks, disc brakes, suspension linkage (A-arm) and/or structures that are designed to substantially crumple or deform under shock loads.

In one example embodiment, a vehicle frame is arranged to absorb energy associated with the deployment of first bollard 412a and second bollard 412b. In other words, the vehicle frame is deformed when first bollard 412a and second bollard 412b are deployed. In this case, first energy absorbing arrangement 416a and second energy absorbing arrangement 416b may be excluded from (not included in) rapid deceleration system 400. It should be appreciated, however, that even if a vehicle frame is arranged to absorb energy associated with the deployment of first bollard 412a and second bollard 412b, first energy absorbing arrangement 416a and second energy absorbing arrangement 416b may be included in rapid deceleration system 400.

As mentioned above, rapid deceleration system 400 may be configured as two substantially separate housings (first housing 410a and second housing 410b). Each housing may be made of various material including metal, etc. and may fully or partially encompass a respective rapid deceleration component. Each housing may be positioned substantially in front of a rear wheel of a vehicle, such as vehicle 101 of FIGS. 1-3. As mentioned above, the number of housings is not limited to two and more or less may be provided. Each respective deceleration component may operate synchronously such that bollards of the rapid deceleration components are deployed at substantially the same time or independently. For example, one or more bollards in a first position (middle of the vehicle) may be deployed first and then one or more bollards at the rear end of the vehicle may be deployed. In other words, the deployments of various bollards may occur in stages.

Figure 5:
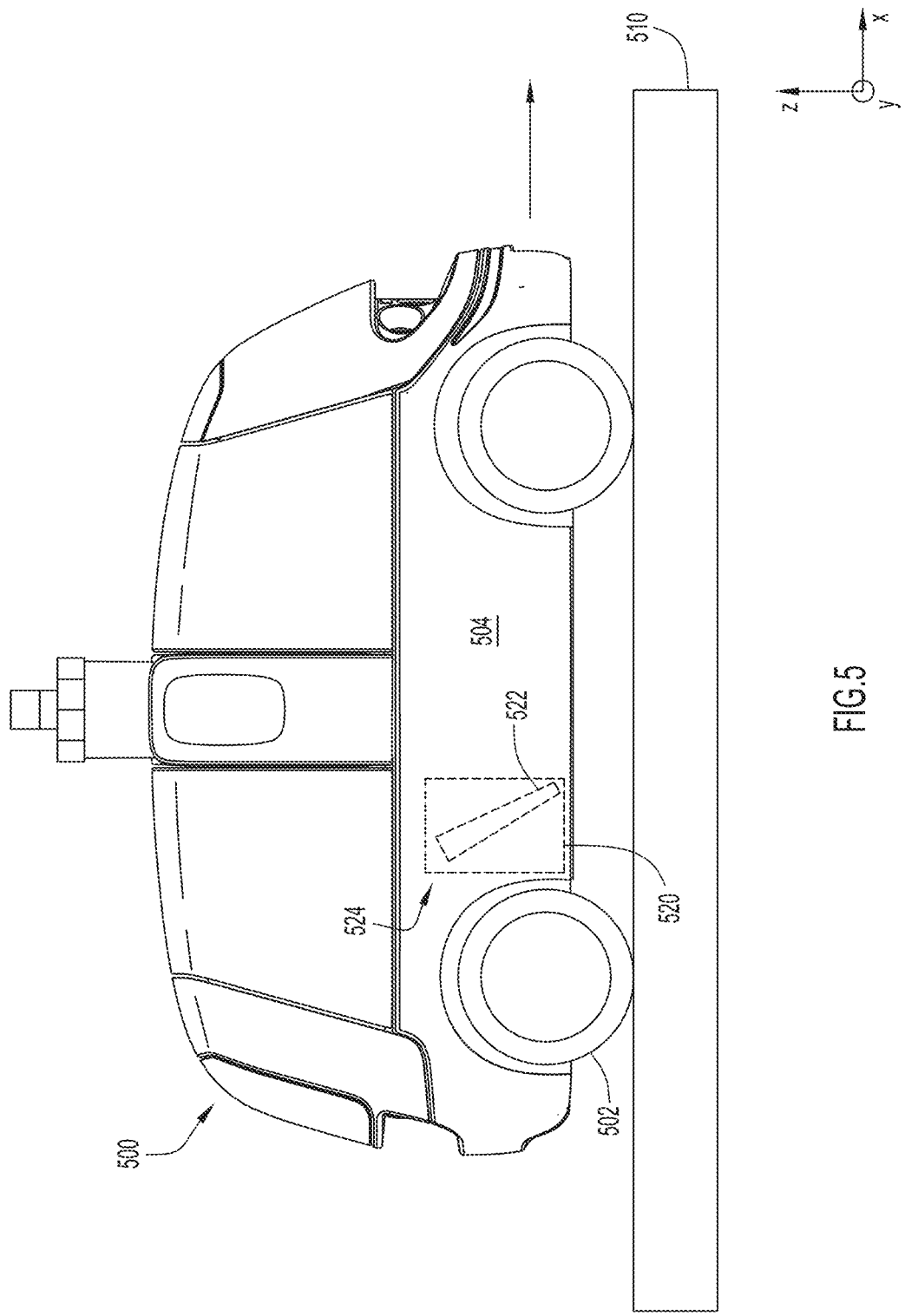
FIG. 5 is a diagram of a vehicle with a rapid deceleration system in an undeployed state, according to an example embodiment.

FIG. 5 is a diagram illustrating a vehicle 500 with a rapid deceleration system in an undeployed state, according to an example embodiment. An autonomous vehicle 500, which may include components and features of autonomous vehicle 101 of FIGS. 1-3, is generally arranged to drive or be otherwise conveyed on a surface 510. One example of surface 510 may be a surface of a road, and may be a pavement surface such as concrete or asphalt. The vehicle 500, among other components explanation of which is omitted for the sake of brevity, includes a rear wheel 502, a body 504, and a rapid deceleration system 520.

Rapid deceleration system 520 is mounted on autonomous vehicle 500. As shown, rapid deceleration system 520 is mounted on an inside of autonomous vehicle 500 near a bottom of autonomous vehicle 500 such that a bollard 522 of the rapid deceleration system 520 is positioned substantially in front of rear wheel 502 of vehicle 500. While only one bollard 522 in a housing 524 is shown in FIG. 5, one of ordinary skill in the art would readily appreciate that another bollard may be located in front of another rear wheel (not shown) of the vehicle 500. Further, number, size, and location of bollards will vary depending on a particular deployment and use case scenario. Additionally, a respective energetics arrangement (not shown) is included in the rapid deceleration system 520.

Rapid deceleration system 520 is positioned substantially over surface 510, and is arranged to allow autonomous vehicle 500 to rapidly decelerate when rapid deceleration system 520 is activated. For example, if autonomous vehicle 500 is travelling in a direction along an x-axis when one or more bollards, including bollard 522, is deployed, autonomous vehicle 500 may be decelerated or otherwise slowed as autonomous vehicle 500 travels in a direction along the x-axis.

The positioning or placement of rapid deceleration system 520 in front of back or rear wheel 502 may be advantageous because it enables rapid deceleration system 520 to be substantially inside of the autonomous vehicle 500 and, thus, effectively hidden from view. In addition, placing rapid deceleration system 520 in an inner volume of autonomous vehicle 500 may effectively allow for a sound damping enclosure around an energetics or firing system that is relatively quiet. The rapid deceleration system 520 is stored inside body 504 of the vehicle 500 in an undeployed state (while not being in use).

Figure 6:
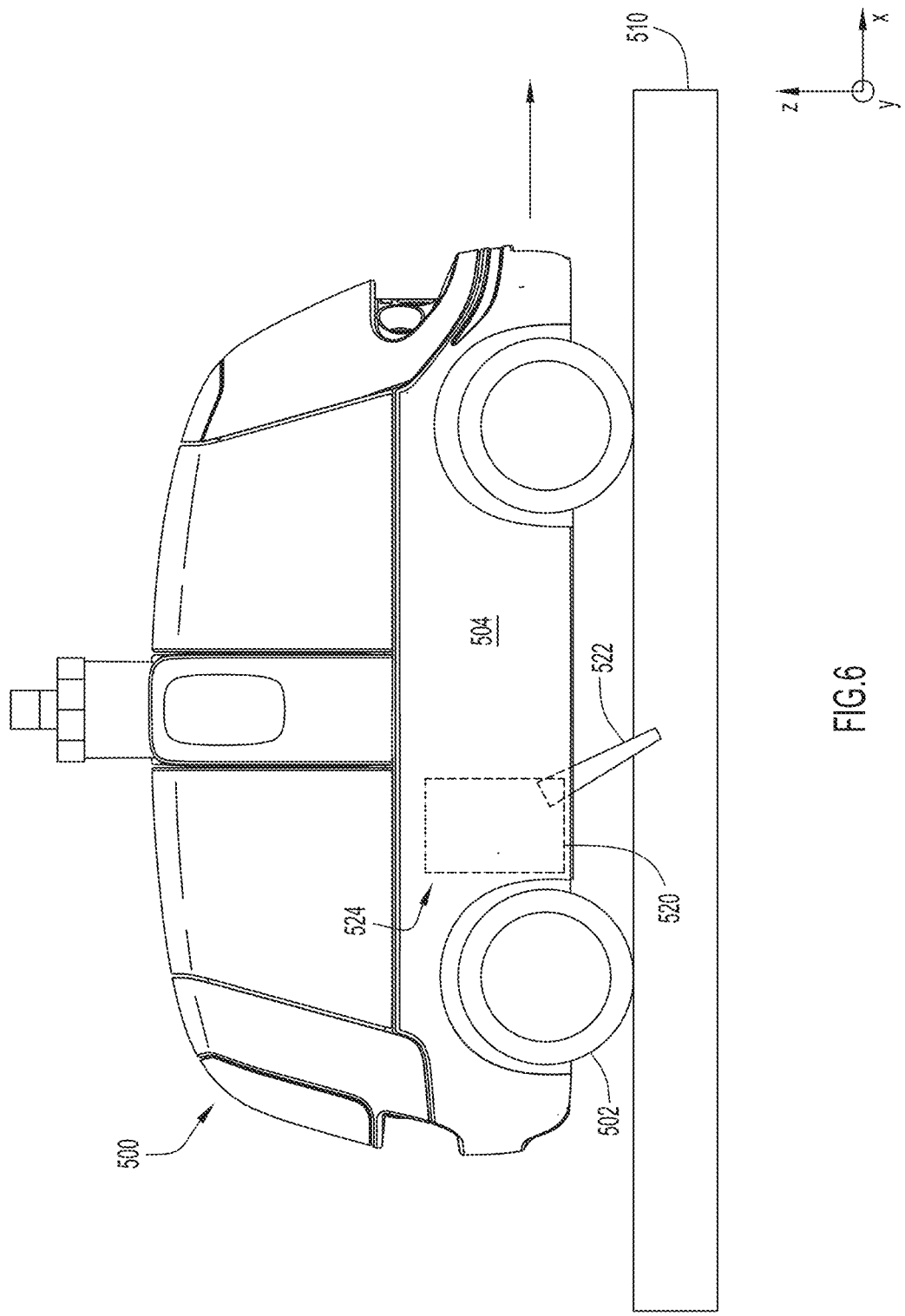
FIG. 6 is a diagram of a vehicle with a rapid deceleration system in a deployed state, according to an example embodiment.

FIG. 6 is a diagram illustrating a vehicle 500 with rapid deceleration system 520 in a deployed state, according to an example embodiment. In a deployed state, the rapid deceleration system 520 is actuated to decelerate body 504 of vehicle 500.

For example, when rapid deceleration system 520 is actuated, bollard 522 is fired or propelled from housing 524 into the surface 510. The bollard 522 is anchored into the surface 510. That is, deployed bollard 522 is substantially secured in or at least partially embedded in surface 510. When vehicle 500 is substantially anchored, hooked, or otherwise attached to surface 510, vehicle 500 may be prevented from continuing to travel in a direction along the x-axis i.e., rapidly decelerated and stopped. As shown, bollard 522 may be deployed into surface 510 at an angle of between approximately zero degrees and approximately ninety degrees, e.g., at an angle of approximately forty-five degrees.

Figure 7:
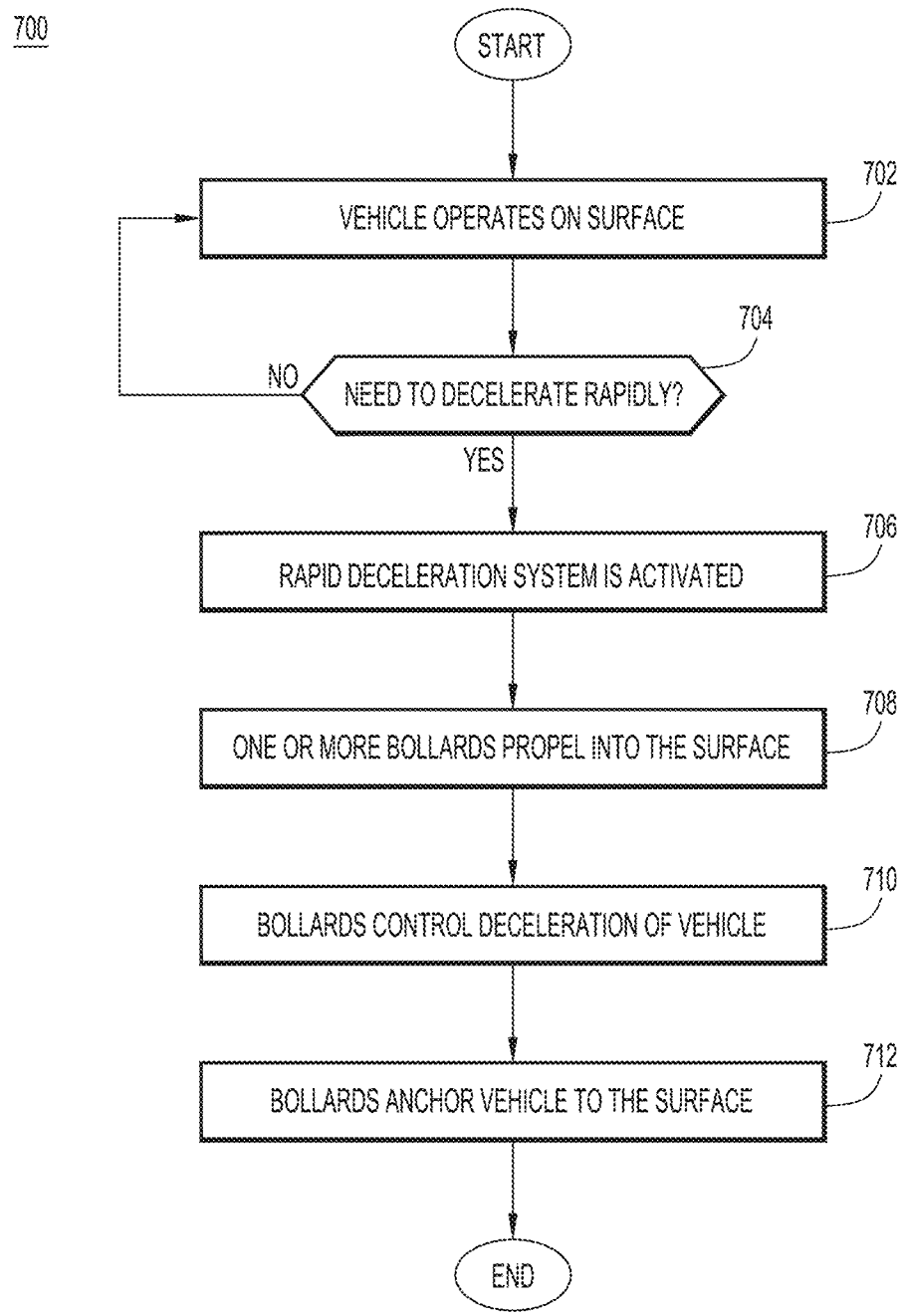
FIG. 7 is a flow chart illustrating a method of rapidly decelerating a vehicle to a stop using a rapid deceleration system, according to an example embodiment.

FIG. 7 is a flow chart illustrating a method 700 of rapidly decelerating a vehicle to a stop using a rapid deceleration system, according to an example embodiment. The method 700 may be performed by a vehicle, such as vehicle 101 of FIGS. 1-3 or vehicle 500 of FIGS. 5 and 6. The method 700 involves utilizing a rapid deceleration system such as rapid deceleration system 322 of FIG. 3, rapid deceleration system 400 of FIG. 4, or rapid deceleration system 520 of FIGS. 5 and 6.

The method 700 begins at 702 in which a vehicle operates e.g., drives, on a surface. In one example embodiment, the vehicle is an autonomous vehicle and the surface may be a concrete or pavement surface of a roadway.

At 704, a processor, such as processor 310 of FIG. 3, determines whether the vehicle needs to decelerate rapidly. This determination may be made when the vehicle determines, for example using sensors of the sensor system 340 of FIG. 3 onboard the vehicle, that a collision with an obstacle such as a pedestrian is likely imminent unless the vehicle decelerates rapidly. In one example embodiment, a determination of whether there is a need for the vehicle to decelerate rapidly may include identifying whether a primary braking system of the vehicle may be sufficient to achieve the necessary deceleration (the deceleration needed to avoid a collision with an obstacle). It should be appreciated that the factors used to determine whether a vehicle is to decelerate rapidly using a deceleration system may vary widely. For example, one factor may be the type of surface, environmental factors (snow, rain), type of obstacle, presence of other factors, etc.

If the determination at 704 is that there is no need for the vehicle to decelerate rapidly, the method 700 returns to 702 in which the vehicle continues to operate on the surface (drive along the road). Alternatively, if it is determined at 704 that there is a need for the vehicle to decelerate rapidly, the method 700 proceeds to 706 in which a rapid deceleration system is effectively activated. Activating the rapid deceleration system causes the rapid deceleration system to deploy one or more bollards, e.g., dual bollards, using respective energetic arrangements such as powered drivers. The bollards may generally be deployed in a substantially downwards direction.

In one example embodiment, initiating deployment of the rapid deceleration system includes sending an instruction, e.g., via a processor and/or control system 360 of FIG. 3, to engage an energetics arrangement of the rapid deceleration system. For example, control system in cooperation with the processor may send an instruction to a propulsion system such as propulsion system 320 of FIG. 3 which includes the rapid deceleration system 322 of FIG. 3. The instruction instructs the propulsion system to activate the rapid deceleration system by engaging the energetics arrangement to fire or propel bollard.

At 708, one or more bollards accelerate into the surface such that the one or more bollards may penetrate a top plane of the surface. That is, the ends or tips of the bollards may break through the surface by puncturing, shattering, compressing, cutting, and/or cracking the surface.

When the bollards accelerate into the surface, at 710, one or more bollards effectively control the deceleration of the vehicle optionally in cooperation with one or more energy absorbing arrangements. The deceleration of the vehicle is controlled as the bollards break through a plane of the surface. The energy absorbing arrangement may be part of the rapid deceleration system, and/or the energy absorbing arrangement may be part of the body of the vehicle, as for example a part of a frame or chassis of the vehicle. The energy removal or dissipation that is typically needed to decelerate a vehicle to a rapid stop may be performed by deforming at least a portion of the body of the vehicle and/or one or more bollards. For example, a part of the vehicle frame may be crush such as a part of the vehicle frame in front of back wheels and/or back wheel wells, as well as one or more bollards may be bent.

At 712, the one or more bollards anchor the vehicle to the surface. Upon the vehicle becoming anchored to the surface, it is effectively stopped and the method 700 of utilizing a rapid deceleration system is completed.

FIGS. 8A and 8B are diagrams illustrating a rapid deceleration system 800 in an undeployed state and a deployed state, respectively, according to an example embodiment. The rapid deceleration system 800 is positioned between a front wheel 802 and back wheel 804 of a vehicle such as vehicle 101 of FIGS. 1-3 or vehicle 500 of FIGS. 5 and 6. The rapid deceleration system 800 is positioned near a frame 806 of the vehicle. The frame 806 is part of a body of the vehicle. It should be appreciated that many features of a vehicle are not shown in FIGS. 8A and 8B for clarity and for ease of illustrations.

The rapid deceleration system 800 includes a housing 810, a bollard 812, and an energetics arrangement 814. As previously mentioned, bollard 812 may be deployed or actuated such that when bollard 812 penetrate a surface 830, bollard 812 is at an angle. It should be appreciated that rapid deceleration system 800 generally includes more than one bollard 812, each of which may be individually housed by a respective housing 810. While individual housing 810 and energetics arrangement 814 for a bollard 812 is depicted in FIGS. 8A and 8B, this is but one example, and a number of bollards may be housed in a single housing 810 and actuated via one single energetics arrangement 814.

In FIG. 8A, rapid deceleration system 800 is mounted on a vehicle prior to deployment (in an undeployed state). Specifically, rapid deceleration system 800 is in an undeployed state and is retracted inside a body of the vehicle. Housing 810 enables rapid deceleration system 800 to be mounted to a portion of a vehicle frame 806. Housing 810, energetics arrangement 814 may effectively be movably coupled to the portion of vehicle frame 806. Bollard 812 may fully be encompassed by housing 810 and may be stored at an angle for compactness and for ease of propelling.

The portion of vehicle frame 806 to which rapid deceleration system 800 is mounted may be positioned in front of a rear wheel 804, and substantially between rear wheel 804 and front wheel 802. In one example embodiment, the portion of vehicle frame 806 is substantially inside a vehicle. In FIG. 8A, front wheel 802 and rear wheel 804 are in contact with a surface 830, as for example while a vehicle travels along x-axis.

In FIG. 8B, rapid deceleration system 800 is activated. That is, the energetics arrangement 814 propels bollard 812 towards the surface 830. In a deployed state, the bollard 812 is partially embedded in surface 830. A tip 820 (a penetrating end), of bollard 812 is embedded in surface 830 at an angle θ, depicted at 840. In one example embodiment, angle θ at 840 may be approximately forty-five degrees, although it should be appreciated that angle θ at 840 may vary.

A base 822 (a non-penetrating end), of bollard 812 is configured to contact the portion of frame 806 while bollard 812 is being deployed, and after the tip 820 is embedded in the surface 830. When base 822 makes contact with the portion of frame 806, energy associated with deploying bollard 812 in a substantially downward direction may be absorbed by the portion of frame 806 as the portion of frame 806 becomes crushed, depicted as crushed frame portion 808. It should be appreciated that parts of bollard 812 in addition to, or in lieu of, base 822 may contact the portion of frame 806 to cause energy to be absorbed. In one example embodiment, shown below, bollard may bend as a vehicle comes to a stop while bollard 812 is embedded in surface 830. When bollard 812 bends, bollard 812 also effectively absorbs some energy associated with deploying the bollard 812.

In one example embodiment, the base 822 may be a launcher that includes a barrel and an energetics assembly that deploys the bollard 812, or generally called an assembly used to both mount a bollard assembly and the assembly that launches the bollard 812. This launcher is attached to the vehicle (e.g. attached to the frame 806). The launcher (non-penetrating end or the base 822) of the bollard 812 is attached to the portion of the frame 806 before deployment, during deployment, after penetration of surface 830, during deceleration, and when autonomous vehicle has come to a complete stop. Energy associated with deploying the bollard 812 in a substantially downward direction is absorbed by surface 830 when bollard 812 partially penetrates and embeds the tip 820 into surface 830. Forward kinetic energy of the vehicle is absorbed when the embedded bollard 812 and frame-mounted launcher bend and plastically deform, or when the embedded bollard 812 and frame-mounted launcher apply a crushing stress that leads to plastic deformation to some portion of the vehicle structure, or by both.

Figure 9A:
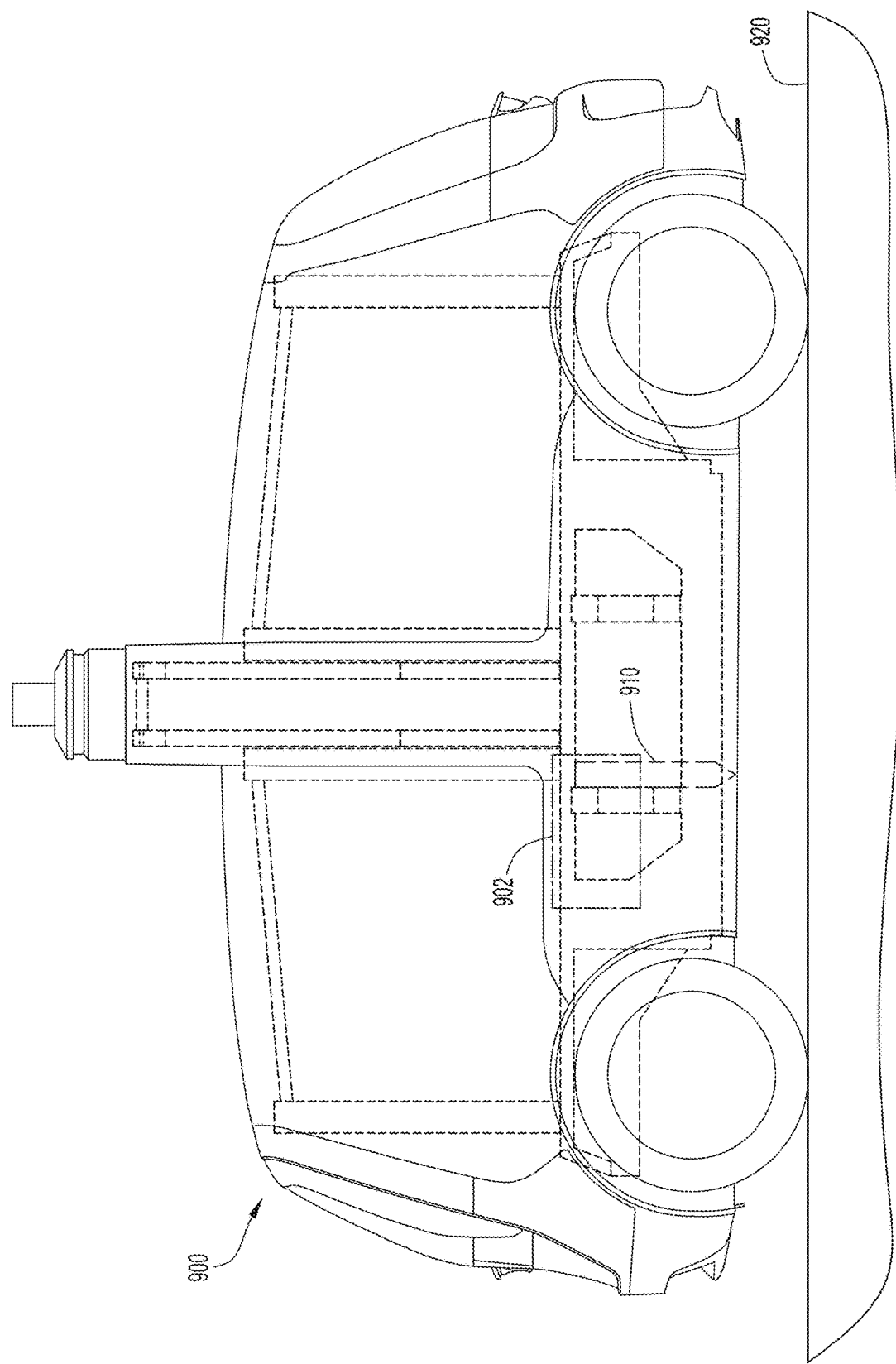
Figure 9C:
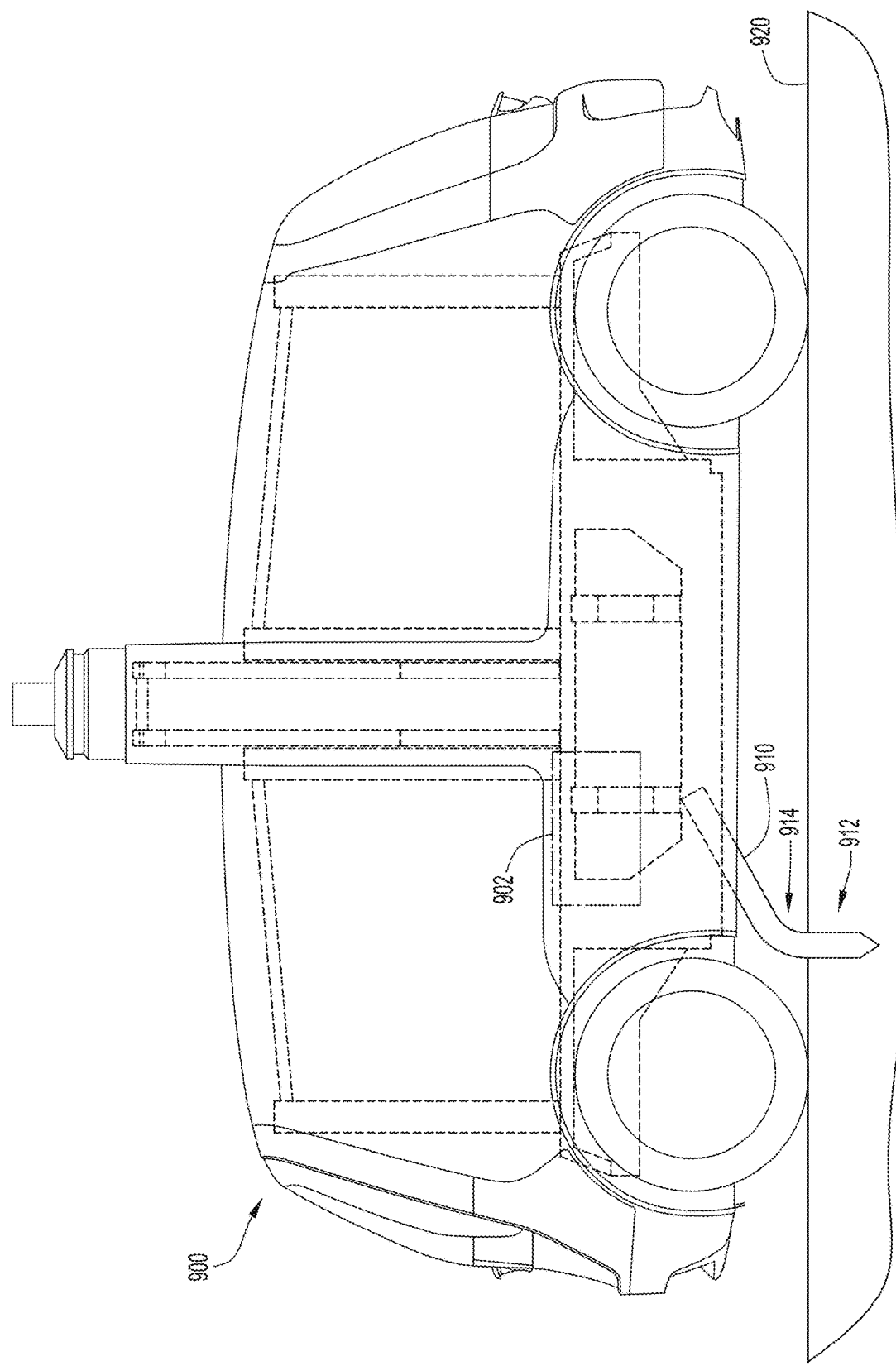

FIGS. 9A-9C are diagrams illustrating a vehicle 900 with a rapid deceleration system in a traveling state, deceleration state, and rapidly stopped state, respectively, according to an example embodiment. An example of a vehicle 900 is vehicle 101 of FIGS. 1-3 or vehicle 500 of FIGS. 5 and 6. An example of the rapid deceleration system is rapid deceleration system 322 of FIG. 3, rapid deceleration system 400 of FIG. 4, rapid deceleration system 520 of FIGS. 5 and 6, or rapid deceleration system 800 of FIGS. 8A and 8B. A number of components and features of the vehicle 900 and rapid deceleration system are not shown for brevity.

In FIG. 9A, a bollard 910 of rapid deceleration system is stored within a vehicle 900 and is attached to a vehicle frame 902. In this traveling state, the bollard 910 is stored in a vertical position along the vehicle frame 902 thereby occupying less space. The vehicle 900 travels on a surface 920.

In FIG. 9B, the rapid deceleration system is activated and the bollard 910 is propelled from the vehicle 900 (from the frame 902) into the surface 920 e.g., via an energetics arrangement (not shown). The vehicle 900 begins to decelerate and is in a deceleration state. The bollard 910 penetrates the surface 920 with a penetrating end 912. The bollard 910 penetrates the surface at an angle θ of 90 degrees. By penetrating the surface 920 at an angle θ of 90 degrees, the bollard 910 penetrates the surface 920 faster than at an angle θ of 45 degrees and may be embedded or anchored into the surface 920 faster and deeper. Since the bollard 910 slides along the vehicle frame 902, the vehicle frame 902 is not deformed and maintains its original shape. The penetrating end 912 is a larger portion of the bollard 910 than the tip 820 of FIG. 8B.

In FIG. 9C, the vehicle 900 is rapidly stopped. The energy associated with deploying bollard 910 in a substantially downward direction may be absorbed by a deformed portion 914 of the bollard 910. It should be appreciated that deformed portion 914 of bollard 910 causes energy to be absorbed by bending as the vehicle 900 comes to a stop after the bollard 910 is embedded in surface 920. When bollard 910 bends at the deformed portion 914, bollard 910 effectively absorbs energy associated with the deployment to bring a vehicle to a complete, rapid stop.

Figure 10B:
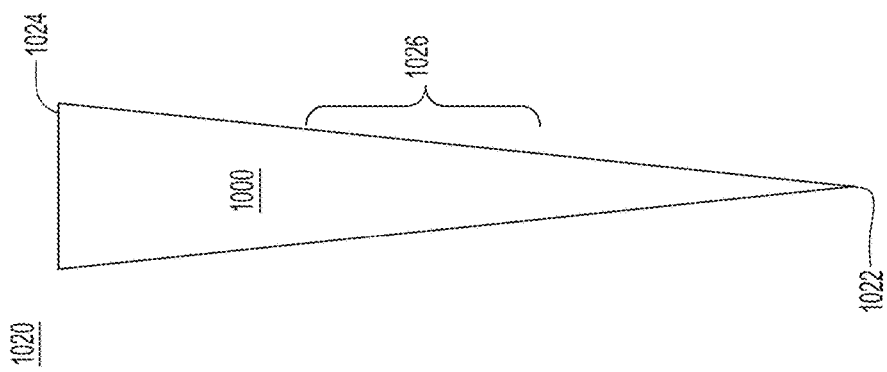
FIGS. 10A and 10B are views illustrating a bollard of a rapid deceleration mechanism, according various example embodiments.
Figure 10A:
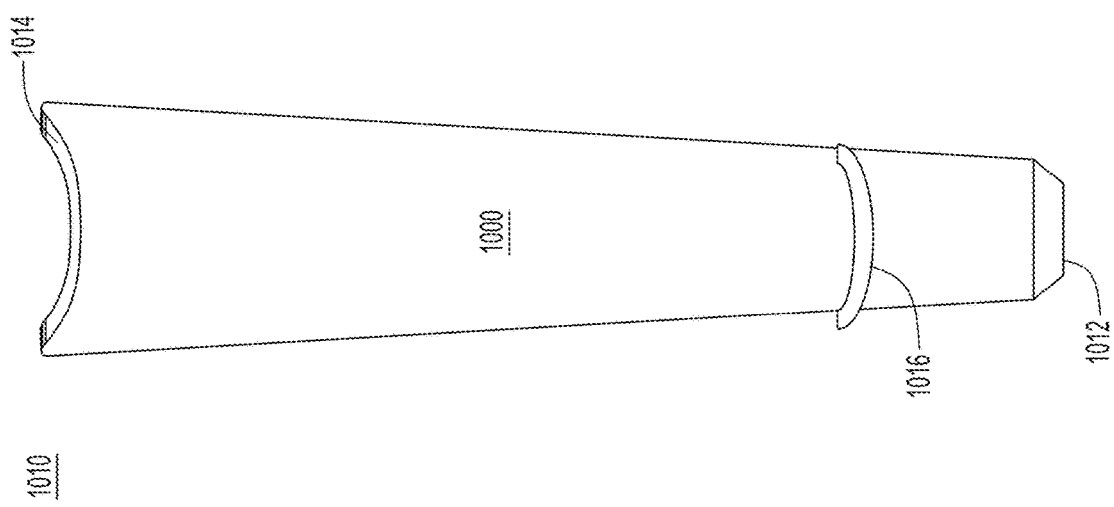

FIGS. 10A and 10B are views illustrating various configurations 1010 and 1020 of a bollard 1000 of a rapid deceleration system, according various example embodiments. Configurations of bollard 1000 may vary widely. As mentioned above, bollards may have a variety of different shapes and sizes. In fact, one rapid deceleration system may include differently shaped and sized bollards based on their location within a vehicle or stage of deployment. Configurations 1010 and 1020 are just a few examples.

FIG. 10A is a view illustrating a configuration 1010 in which a bollard 1000 is hollow tapered, conically shaped, according to an example embodiment. In the configuration 1010, the bollard 1000 includes a penetrating end 1012 and a non-penetrating end 1014. Penetrating end 1012 is configured to be forced into a surface to cause bollard 1000 to be embedded into the surface. Non-penetrating end 1014 may be coupled to an energetics arrangement used to deploy bollard 1000.

The configuration 1010 is a portion of a hollowed, tapered cone. This configuration 1010 may increase the surface per volume of bollard 1000 compared to other shapes such as a nail shape or an ogive nose on cylinder. The configuration 1010 facilitates bending in a forward direction, as for example when a forward direction is in a positive direction along an x-axis. Penetrating end 1012 generally has a smaller diameter than non-penetrating end 1014. Optionally, a tension strap D-ring termination 1016 may slide up the smaller size of bollard until the tension strap D-ring termination is unable to slide up any further and, thus, stops or comes to a rest.

FIG. 10B is a view illustrating a configuration 1020 in which a bollard 1000 is conically shaped, according to an example embodiment. In the configuration 1020, the bollard 1000 includes a penetrating tip 1022 and a non-penetrating portion 1024. The penetrating tip 1022 may be thin and sharp to cut into surface and to cause bollard 1000 to be embedded therein. The penetrating tip 1022 has a substantially smaller diameter than the non-penetrating portion 1024. Non-penetrating portion 1024 may include a deformation portion 1026 which is deformed or bent to bring the vehicle to a rapid stop. That is, the deformation portion 1026 changes its shape to absorb energy associated with stopping the vehicle. The non-penetrating portion 1024 is coupled to an energetics arrangement used to deploy bollard 1000.

Figure 11C:
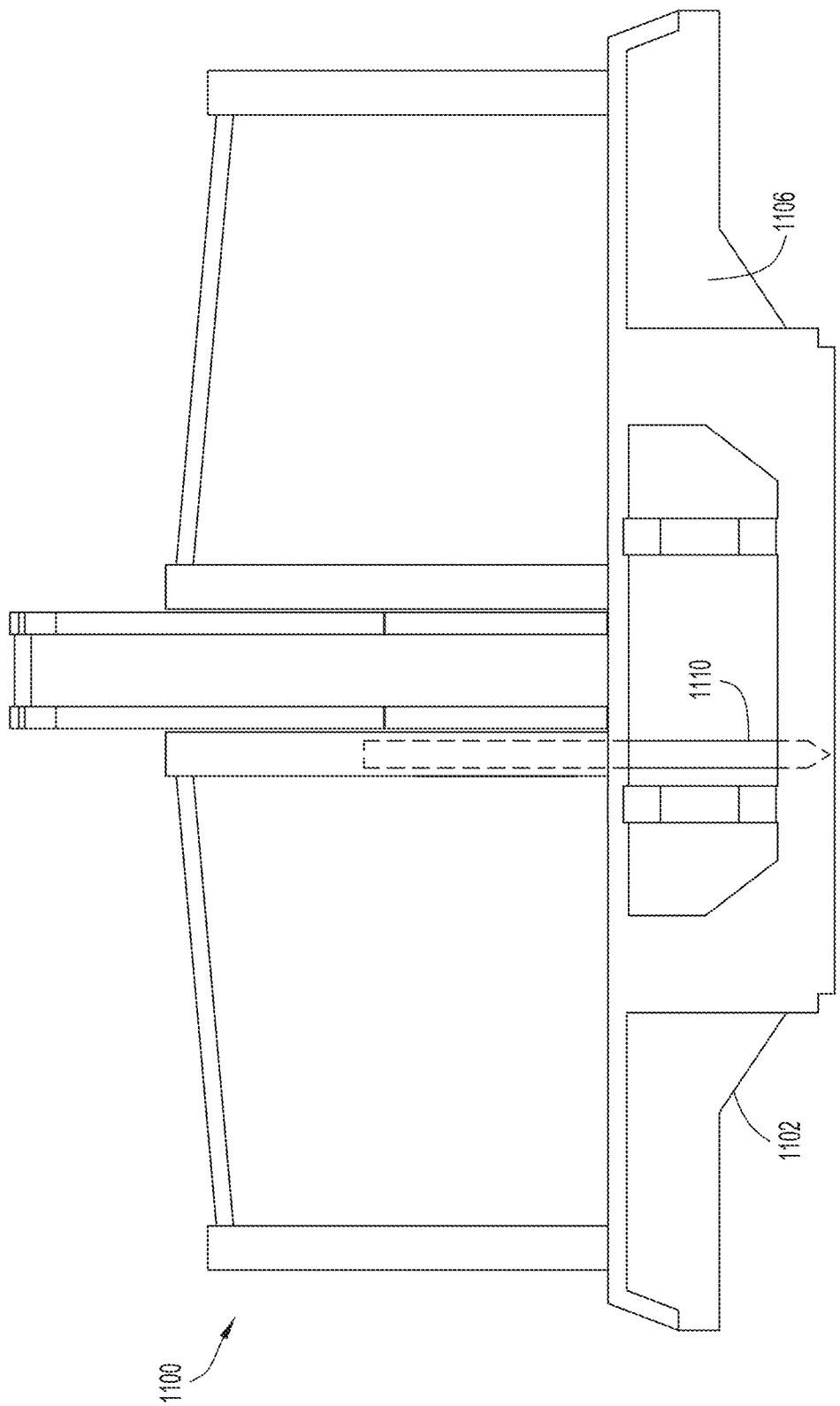

FIGS. 11A-11C are diagrams illustrating a frame 1100 of a vehicle with bollards of a rapid deceleration system in various states, according to an example embodiment.

FIG. 11A illustrates a frame 1100 of a vehicle with bollards 1110 of a rapid deceleration mechanism in a deployed state, according to an example embodiment. A frame 1100, or a chassis, of a vehicle includes rear wheel wells 1102 substantially within which rear tires or wheels (not shown) are arranged. Bollards 1110, which are part of a rapid deceleration mechanism as discussed above, are configured to be situated in front of rear wheel wells 1102 relative to an x-axis. It should be appreciated that while one rear wheel well 1102 is shown as being substantially behind bollards 1110, the view of frame 1100 is such that another wheel well (not shown) is substantially behind bollards 1110.

Bollards 1110 are in a deployed position and are embedded in a surface 1120. As shown bollards 1110 are deployed such that they penetrate surface 1120 at an angle, an angle of between approximately zero degrees and approximately ninety degrees. When bollards are deployed, energy associated with the deployment may be absorbed in part by a frame portion 1104 of frame 1100 which may be crushed or deformed to absorb the energy. In one example embodiment, bollards 1110 may also deform or bend to absorb energy associated with deployment, as described above.

FIG. 11B illustrates frame 1100 with bollards 1110 in an undeployed state, or retracted position, according to an example embodiment. When bollards 1110 are in undeployed state, bollards 1110 may be contained substantially within frame 1100 such that bollards 1110 are effectively inside of body 1106 of the vehicle.

FIG. 11C illustrates frame 1100 with bollards 1110 in an undeployed state, or retracted position, according to yet another example embodiment. When bollards 1110 are in undeployed state, bollards 1110 are substantially parallel with frame 1100 and are also effectively inside of body 1106 of the vehicle.

Figure 12:
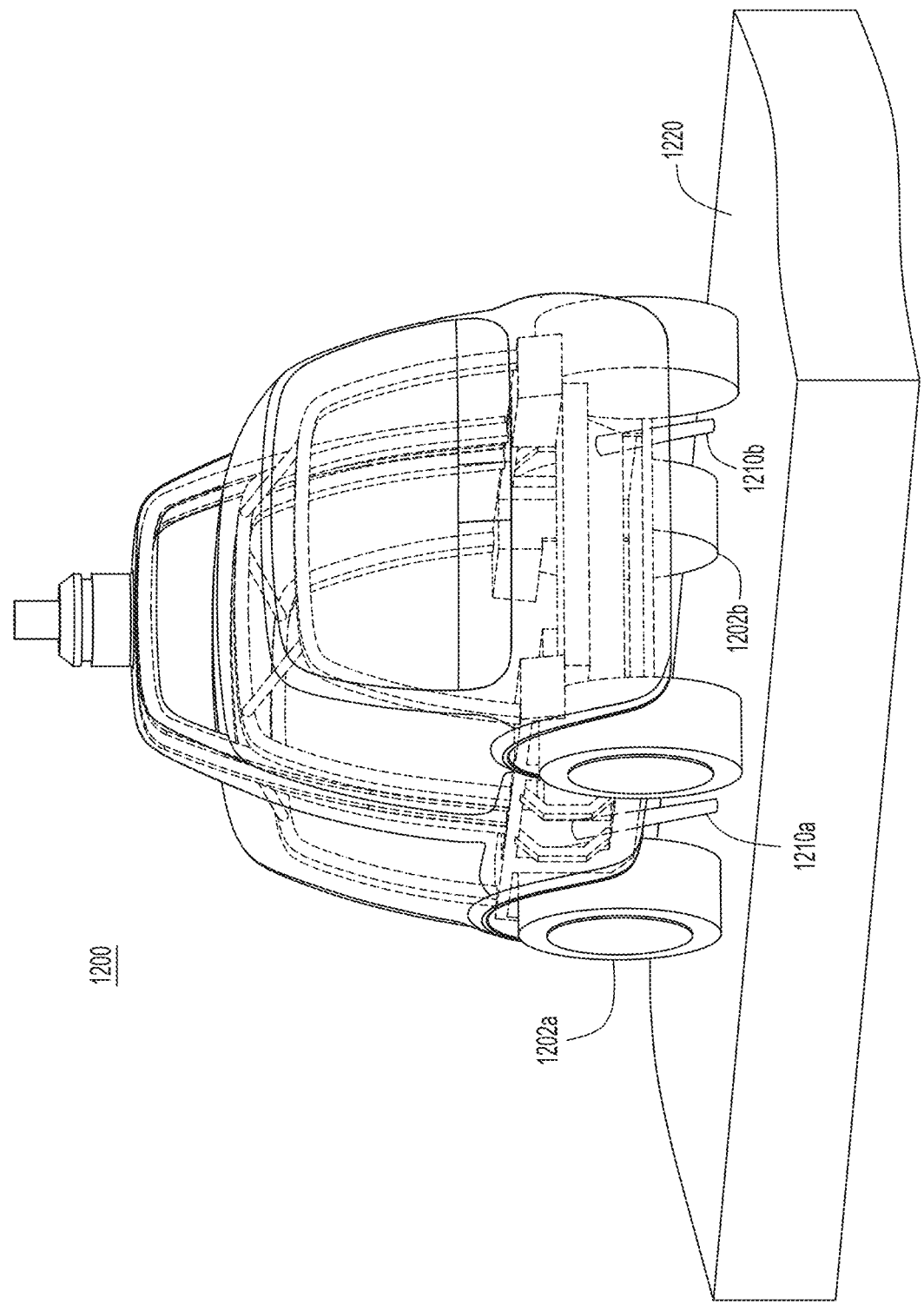
FIG. 12 is a diagram illustrating a vehicle with a pair of bollards of a rapid deceleration system in a deployed state, according to another example embodiment.

FIG. 12 is a diagram illustrating a vehicle 1200 with a pair of bollards of a rapid deceleration system in a deployed state, according to another example embodiment.

Vehicle 1200 includes a first rear wheel 1202*a* that is positioned behind a first bollard 1210*a*, and a second rear wheel 1202*b* that is positioned substantially behind a second bollard 1210*b*. First bollard 1210*a* and second bollard 1210*b* are deployed such that portions of are at least partially embedded in a surface 1220 which may be a road surface.

Figure 13:
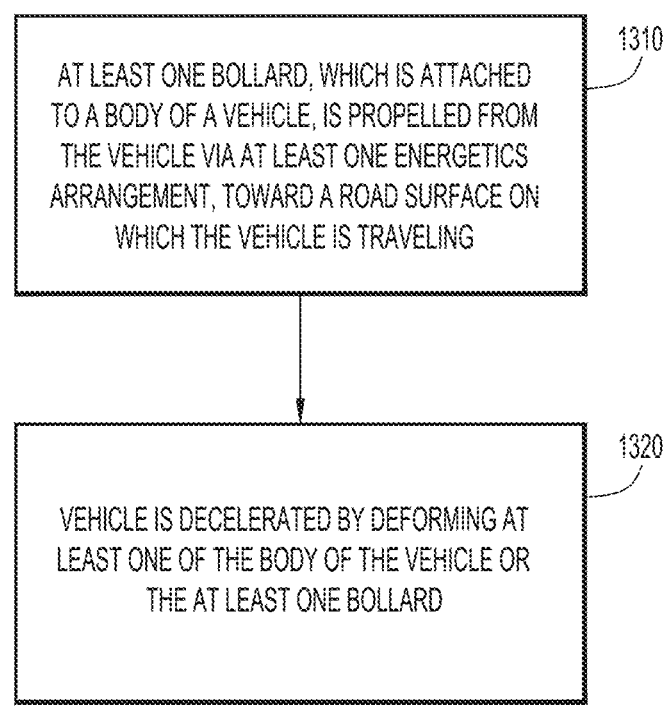
FIG. 13 is a flow chart depicting, at a high-level, operations of engaging an autonomous vehicle to perform a stop using a rapid deceleration mechanism, according to an example embodiment.

FIG. 13 is a flow chart depicting a method 1300 of rapidly decelerating an autonomous vehicle. The method 1300 may be performed by the system components 300 of the autonomous vehicle 101 of FIGS. 2 and 3 such as rapid deceleration system 322 of FIG. 3, rapid deceleration system 400 of FIG. 4, rapid deceleration system 520 of FIGS. 5 and 6, or rapid deceleration system 800 of FIGS. 8A and 8B.

The method 1300 begins at 1310, in which at least one bollard, which is attached to a body of a vehicle, is propelled from the vehicle via at least one energetics arrangement, toward a road surface on which the vehicle is traveling.

In the method 1300, at 1320, the vehicle is decelerated by deforming at least one of the body of the vehicle or the at least one bollard.

In one form, the operation 1320 of decelerating the vehicle may include bending the at least one bollard in response to the at least one bollard contacting the road surface.

In another form, the operation 1320 of decelerating the vehicle may include bending a frame of the body in response to the at least one bollard contacting the road surface.

In yet another form, the operation 1320 of decelerating the vehicle may include partially crushing a portion of the body and bending the at least one bollard.

According to one or more example embodiments, the method 1300 may further include positioning the at least one bollard within the body in an undeployed state. The operation 1320 of decelerating the vehicle may further include cutting, by the at least one bollard, into the road surface in a deployed state.

Although only a few embodiments have been described in this disclosure, it should be understood that the disclosure may be embodied in many other specific forms without departing from the spirit or the scope of the present disclosure. By way of example, the absorption of energy associated with deploying one or more bollards to decelerate a vehicle has been described as including one or both crushing part of a vehicle frame and by bending the bollards. However, other methods of absorbing energy may be implemented. Such other methods may include, but are not limited to including, crushing a back suspension system of a vehicle, and/or placing the bollard behind the frame of a wheel well and using a high strength strap to crush the frame and/or suspension.

A rapid deceleration mechanism may be mounted on a vehicle, as for example to a bottom side of a chassis, using any suitable mechanism and/or method. For example, mechanical fasteners such as screws and/or bolts may be used to couple a housing of a rapid deceleration mechanism to a chassis of a vehicle.

Bollards, when embedded into a road, enable a vehicle to come to a stop by crushing part of the vehicle frame as by bending the bollards. In one embodiment, a safety lanyard may be placed on each side of the vehicle for each bollard to essentially make sure the vehicle is held downward toward the road. By using the existing vehicle frame to absorb energy, a rapid deceleration mechanism may be implemented substantially without the need for a dedicated crush can. As a result, rather than occupying space with a dedicated crush can, that space may be allocated for other purposes, e.g., for more battery capacity.

As would be recognized by a person of skill in the art, the steps associated with the methods of the present disclosure, including method 1300, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

An autonomous vehicle has generally been described as a land vehicle, or a vehicle that is arranged to be propelled or conveyed on land. It should be appreciated that in some embodiments, an autonomous vehicle may be configured for water travel, hover travel, and/or air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement and may include any quantity of any types of fields of any size to store the data. The definition and data model for any datasets may indicate the overall structure in any desired fashion (e.g., computer-related languages, graphical representation, listing, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in another form, a vehicle is provided that includes a body and a rapid deceleration mechanism configured to decelerate the body traveling on a road surface. The rapid deceleration mechanism includes at least one bollard attached to the body and at least one energetics arrangement configured to propel the at least one bollard from the body toward the road surface to decelerate the body such that at least one of a portion of the body or the at least one bollard is deformed.

In one instance, the at least one bollard may be configured to decelerate the body by bending of the at least one bollard in response to the at least one bollard contacting the road surface.

In another instance, the body may include a frame. A portion of the frame may be configured to deform when the at least one bollard contacts the road surface to decelerate the body.

In yet another instance, the at least one bollard may be configured to decelerate the body by partially crushing the portion of the body and by bending of the at least one bollard.

According to one or more example embodiments, the vehicle may further include a braking system configured to decelerate the vehicle. At least one energetics arrangement may be configured to propel the at least one bollard downward towards the road surface in response to a determination that the braking system is inadequate to achieve a desired deceleration.

In one form, the at least one energetics arrangement may include a powered driver or an actuating mechanism to cause the at least one bollard to be fired from the body downward toward the road surface.

In another form, the body may include a frame or a chassis to which the at least one energetics arrangement is movably attached.

According to one or more example embodiments, at least one bollard may be a conical bollard, tapered bollard, shaped as a portion of a hollowed and tapered cone, or may be shaped as a nail bollard.

In one instance, at least one bollard may include a non-penetrating portion and a penetrating tip that cuts into the road surface and has a smaller diameter than the non-penetrating portion.

In another instance, at least one bollard may be positioned within the body in an undeployed state and may be configured to cut into the road surface to decelerate the body in a deployed state.

According to one or more example embodiments, the body may include a frame. The rapid deceleration mechanism may further include at least one safety strap attached to the frame and at least one bollard. At least one safety strap may be configured to hold the at least one bollard when the at least one bollard is being deformed to decelerate the body.

In one form, the vehicle may further include at least one energy absorbing arrangement configured to absorb energy associated with a deployment of the at least one bollard.

According to one or more example embodiments, the rapid deceleration mechanism may include at least two deceleration housings that are positioned substantially inside the body at a bottom portion thereof and are formed separately from one another. Each of the at least two deceleration housings may include a respective bollard and a respective energetics arrangement.

In yet another form, a rapid deceleration system may be provided. The rapid deceleration system includes at least one bollard attached to a body of a vehicle and at least one energetics arrangement configured to propel the at least one bollard from a vehicle toward a road surface on which the vehicle is traveling to decelerate the vehicle such that at least one of a portion of the body or the at least one bollard is deformed.

According to one or more example embodiments, the at least one bollard may decelerate the vehicle by bending in response to the at least one bollard contacting the road surface.

In one instance, the at least one bollard may decelerate the vehicle by contacting the road surface and causing a deformation of a frame of the vehicle.

In another instance, at least one energetics arrangement may include a powered driver or an actuating mechanism to cause the at least one bollard to be fired from the vehicle downward toward the road surface.

The descriptions of the various example embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A vehicle comprising:
   a body including a frame; and
   a rapid deceleration mechanism configured to decelerate the body traveling on a road surface, the rapid deceleration mechanism comprising:
   at least one bollard attached to the body; and
   at least one energetics arrangement configured to propel the at least one bollard from the body toward the road surface to decelerate the body such that a base of the at least one bollard contacts the frame at a contact point in response to the at least one bollard contacting the road surface causing at least a portion of the frame around the contact point to be deformed.

2. The vehicle of claim 1, wherein the at least one bollard is configured to decelerate the body by bending of the at least one bollard in response to the at least one bollard contacting the road surface.

3. The vehicle of claim 1, wherein the at least one bollard is configured to decelerate the body by partially crushing the portion of the frame and by bending of the at least one bollard.

4. The vehicle of claim 1, further comprising:
   a braking system configured to decelerate the vehicle, wherein the at least one energetics arrangement is configured to propel the at least one bollard downward towards the road surface in response to a determination that the braking system is inadequate to achieve a desired deceleration.

5. The vehicle of claim 1, wherein the at least one energetics arrangement includes a powered driver or an actuating mechanism to cause the at least one bollard to be fired from the body downward toward the road surface.

6. The vehicle of claim 1, wherein the frame is a chassis to which the at least one energetics arrangement is movably attached.

7. The vehicle of claim 1, wherein the at least one bollard is a conical bollard, tapered bollard, shaped as a portion of a hollowed and tapered cone, or is shaped as a nail bollard.

8. The vehicle of claim 1, wherein the at least one bollard includes a non-penetrating portion and a penetrating tip that cuts into the road surface and has a smaller diameter than the non-penetrating portion.

9. The vehicle of claim 1, wherein the at least one bollard is positioned within the body in an undeployed state and is configured to cut into the road surface to decelerate the body in a deployed state.

10. The vehicle of claim 1, wherein the rapid deceleration mechanism further includes at least one safety strap attached to the frame and the at least one bollard, and the at least one safety strap is configured to hold the at least one bollard when the at least one bollard is being deformed to decelerate the body.

11. The vehicle of claim 1, further comprising:
    at least one energy absorbing arrangement configured to absorb energy associated with a deployment of the at least one bollard.

12. The vehicle of claim 1, wherein the rapid deceleration mechanism includes:
    at least two deceleration housings that are positioned substantially inside the body at a bottom portion thereof and are formed separately from one another, wherein each of the at least two deceleration housings includes a respective bollard and a respective energetics arrangement.

13. The vehicle of claim 1, wherein the at least one bollard includes:
   the base at one end thereof, the base configured to contact the frame when the at least one bollard is deployed; and
   a penetrating portion that is configured to cut into the road surface.

14. The vehicle of claim 1, wherein a penetrating portion is a larger portion of the at least one bollard and further comprising:
   a barrel at one end of the at least one bollard that is attached to the frame and is configured to deform when another end of the at least one bollard contacts the road surface.

15. A method comprising:
   propelling, from a vehicle that includes a frame, via at least one energetics arrangement, at least one bollard attached to a body the vehicle, toward a road surface on which the vehicle is traveling; and
   decelerating the vehicle by having a base of the at least one bollard contact a portion of the frame at a contact point in response to the at least one bollard contacting the road surface and deform at least a portion of the frame around the contact point.

16. The method of claim 15, wherein decelerating the vehicle includes:
   bending the at least one bollard in response to the at least one bollard contacting the road surface.

17. The method of claim 15, wherein decelerating the vehicle includes:
   partially crushing the portion of the frame; and
   bending the at least one bollard.

18. The method of claim 15, further comprising:
   positioning the at least one bollard within the body in an undeployed state,
   wherein decelerating the vehicle includes cutting, by the at least one bollard, into the road surface in a deployed state.

19. A rapid deceleration system comprising:
   at least one bollard attached to a body of a vehicle, wherein the body includes a frame; and
   at least one energetics arrangement configured to fire the at least one bollard at an angle of approximately ninety degrees from the vehicle toward a road surface on which the vehicle is traveling to decelerate the vehicle such that the at least one bollard slides along the frame and embeds a penetrating portion of the at least one bollard into the road surface causing another portion of the at least one bollard to deform.

20. The rapid deceleration system of claim 19, wherein the at least one bollard decelerates the vehicle by contacting the road surface and causing a deformation of the portion of the frame of the vehicle.

21. The rapid deceleration system of claim 19, wherein the at least one energetics arrangement includes a powered driver or an actuating mechanism to cause the at least one bollard to be fired from the vehicle downward toward the road surface.

22. The rapid deceleration system of claim 19, wherein the at least one bollard is stored in a vertical position along the frame of the vehicle.

* * * * *